United States Patent
Ishii et al.

(10) Patent No.: US 8,023,172 B2
(45) Date of Patent: Sep. 20, 2011

(54) MIRROR DEVICE

(75) Inventors: Fusao Ishii, Pittsburgh, PA (US);
Yoshihiro Maeda, Tokyo (JP);
Hirotoshi Ichikawa, Tokyo (JP); Naoya Sugimoto, Tokyo (JP)

(73) Assignees: Silicon Quest Kabushiki-Kaisha (JP);
Olympus Corporation (JP)

( * ) Notice: Subject to any disclaimer, the term of this patent is extended or adjusted under 35 U.S.C. 154(b) by 0 days.

(21) Appl. No.: 12/220,501

(22) Filed: Jul. 25, 2008

(65) Prior Publication Data

US 2008/0285111 A1    Nov. 20, 2008

Related U.S. Application Data

(63) Continuation-in-part of application No. 11/894,248, filed on Aug. 18, 2007, now Pat. No. 7,835,062.

(60) Provisional application No. 60/841,173, filed on Aug. 30, 2006.

(51) Int. Cl.
*G02B 26/00* (2006.01)
*G02B 26/08* (2006.01)

(52) U.S. Cl. ..................................... 359/290; 359/224.1

(58) Field of Classification Search .......... 359/212–214, 359/224, 290–292, 198.1, 214.1, 224.1
See application file for complete search history.

(56) References Cited

U.S. PATENT DOCUMENTS

| | | | |
|---|---|---|---|
| 5,447,600 | A | 9/1995 | Webb |
| 5,497,262 | A | 3/1996 | Kaeriyama |
| 5,526,951 | A | 6/1996 | Bailey et al. |
| 5,673,139 | A | 9/1997 | Johnson |
| 5,936,760 | A | 8/1999 | Choi et al. |
| 6,128,121 | A | 10/2000 | Choi et al. |
| 6,735,008 | B2 | 5/2004 | Brophy et al. |
| 6,861,277 | B1 | 3/2005 | Monroe et al. |
| 6,862,127 | B1 | 3/2005 | Ishii |
| 6,891,655 | B2 | 5/2005 | Grebinski et al. |
| 6,917,459 | B2 | 7/2005 | Nikkel et al. |
| 7,022,249 | B2 | 4/2006 | Valette |
| 7,027,207 | B2 | 4/2006 | Huibers |
| 7,046,415 | B2 | 5/2006 | Jilani et al. |
| 7,068,417 | B2 | 6/2006 | Yang |
| 7,183,618 | B2 | 2/2007 | Ishii |
| 7,184,195 | B2 | 2/2007 | Yang |
| 7,273,693 | B2 | 9/2007 | Nikkel et al. |
| 7,375,872 | B2 | 5/2008 | Ishii |
| 7,436,573 | B2 | 10/2008 | Doan et al. |
| 2005/0162727 | A1 | 7/2005 | Ishii |
| 2005/0264866 | A1* | 12/2005 | Ohtaka et al. ................ 359/290 |
| 2006/0077531 | A1 | 4/2006 | Novotny et al. |
| 2007/0097486 | A1 | 5/2007 | Yang et al. |

* cited by examiner

*Primary Examiner* — William Choi
(74) *Attorney, Agent, or Firm* — Bo-In Lin

(57) ABSTRACT

A mirror device, comprising: a mirror; an electrode which is placed on a substrate and on which surface a cavity is formed; and a hinge placed between the mirror and electrode, wherein the hinge is connected to the cavity of the electrode.

3 Claims, 22 Drawing Sheets

MIRROR DEVICE

CROSS REFERENCE TO RELATED APPLICATIONS

This application is Continuation in Part (CIP) application of a patent application Ser. No. 11/894,248 filed on Aug. 18, 2007 now U.S. Pat. No. 7,835,062 by one of the common Inventors of this patent application. Application Ser. No. 11/894,248 is a Non-provisional application of a Provisional Application 60/841,173 filed on Aug. 30, 2006. The Provisional Application 60/839,637 is a Continuation in Part (CIP) application of a pending U.S. patent application Ser. Nos. 11/121,543 filed on May 4, 2005. The application Ser. No. 11/121,543 is a Continuation in part (CIP) application of three previously filed applications. These three applications are Ser. No. 10/698,620 filed on Nov. 1, 2003, Ser. No. 10/699,140 filed on Nov. 1, 2003, and Ser. No. 10/699,143 filed on Nov. 1, 2003 by one of the Applicants of this patent application. The disclosures made in these patent applications are hereby incorporated by reference in this patent application.

BACKGROUND OF THE INVENTION

1. Field of the Invention

The present invention relates to a spatial light modulator (SLM) implemented with a mirror device for modulating incident light to project images for an image display system. More particularly, this invention relates to a mirror device with structure to connect an elastic hinge supporting the mirror.

2. Description of the Related Art

Even though there are significant advances of the technologies for implementing an electromechanical mirror device as a spatial light modulator (SLM) in recent years, there are still limitations and difficulties when it is employed to display a high quality image. Specifically, when the images are digitally controlled, the image quality is adversely affected due to the fact that the images are not displayed with sufficient number of gray scales.

An electromechanical mirror device is drawing a considerable interest as a spatial light modulator (SLM). The electromechanical mirror device consists of a "mirror array" implemented with a large number of mirror elements. In general, the mirror array may include from 60,000 to several millions of mirror elements arranged on a surface of a substrate in an electromechanical mirror device.

Referring to FIG. 1A, an image display system 1 including a screen 2 is disclosed in a reference U.S. Pat. No. 5,214,420. A light source 10 is used for generating light energy for illuminating the screen 2. The generated light 9 is further concentrated and directed toward a lens 12 by a mirror 11. Lenses 12, 13 and 14 form a beam columnator operative to columnate light 9 into a column of light 8. A spatial light modulator (SLM) 15 receives data input from a computer 19 via a bus 18 to control the micromirrors of the SLM for selectively reflecting and redirecting portions of light projected from a path 7 toward an enlarger lens 5 and onto a screen 2. FIG. 1B shows a SLM 15 that has a mirror array configured as switchable reflective elements 17, 27, 37, and 47 each includes a mirror 33 supported on a hinge 30 extended from a surface 16 of a substrate as the electromechanical mirror device. When the element 17 is controlled to be in an ON position, a portion of the light from the path 7 is reflected and redirected along a path 6 to lens 5 where it is enlarged or spread along the path 4 to impinge on the screen 2 to form an illuminated pixel 3. When the element 17 is controlled to turn to an OFF position, the light is reflected away from the screen 2 and hence the pixel 3 is dark.

Therefore, the mirror device as shown comprises a plurality of mirror elements to function as spatial light modulator (SLM) and each mirror element comprises a mirror and electrodes. A voltage applied to the electrode(s) generates a coulomb force between the mirror and the electrode(s). The signals applied to the electrodes therefore control and incline the mirror. The mirror element is "deflected" according to a common term used in this specification for describing the operational condition of the mirror element.

When a voltage is applied to the electrode(s) the mirror is deflected the direction of the reflected light is changed in accordance with the deflection angle of the mirror. The present specification refers to an ON state of the mirror when most of the entirety of an incident light is reflected to a projection path designated for image display, and an OFF state when the light reflected to a direction away from the designated projection path for image display.

Further, a state of the mirror is referred to as a specific ratio when the mirror reflects only a portion of an incident light at a specific ratio relative to the ON light to the image projection path. The mirror is operated in this state when shifted between the ON state and the OFF state. And that the light reflected to the projection path with a smaller quantity of light than the state of the ON light is referred to as an "intermediate light".

The terminology of present specification defines an angle of rotation along a clockwise (CW) direction as a positive (+) angle and that of counterclockwise (CCW) direction as negative (−) angle. A deflection angle is defined as zero degree (0°) when the mirror is in the initial state when there is no voltage applied to the electrode(s).

Most of the conventional image display devices such as the devices disclosed in U.S. Pat. No. 5,214,420 implements a dual-state mirror control that controls the mirrors in a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as a control related to the ON or OFF state. Since the mirror is controlled to operate in either the ON or OFF state, the conventional image display apparatus has no way to provide a pulse width for controlling the mirror that is shorter than the control duration allowable on the basis of the LSB. The least quantity of light, which is determined on the basis of the gray scale, is the light reflected during the time duration based on the least pulse width. The limited number of gray scales leads to a degradation of the image.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a data signal via a Bit-line. The memory cell 32 stores data for access is turned on when the transistor M9 receives a ROW signal on a Word-line. The latch 32a consists of two cross-coupled inverters, i.e., M5/M6 and M7/M8, which permit two stable states, that include a state 1 when Node A is high and Node is B low, and a state 2 when Node A is low and Node B is high.

The mirror is driven by a voltage applied to the address electrode abutting an address electrode and is held at a predetermined deflection angle on the address electrode. An elastic "landing chip" is formed at a portion on the address electrode. The address electrode contacts and stops the mirror when the mirror is deflected to a predefined angle. The mirror then deflects toward the opposite direction when a voltage applied to the electrode is switched. The landing chip is designed to have the same potential with the address electrode and that prevents short circuit damages when the address electrode is in contact with the mirror.

Each mirror formed on a device substrate has a square or rectangular shape and each side has a length of 4 to 15 μm. In this configuration, a reflected light spreading outside of an angular ranges specifically designed for image display may inadvertently generated from the gaps between adjacent mirrors. The reflections generated from the gaps between the mirrors have an undesirable effect of degrading the contrast of an image display. As a result, the quality of the image display is adversely affected. In order to overcome such problems, the mirrors are arranged on a semiconductor wafer substrate with a layout to minimize the gaps between the mirrors. A mirror device is generally designed to include an appropriate number of mirror elements wherein each mirror element is manufactured as a deflectable mirror on the substrate for displaying a pixel of an image. The appropriate number of elements for displaying image is in compliance with the display resolution standard according to a VESA Standard defined by Video Electronics Standards Association or television broadcast standards. In the case in which the mirror device has a plurality of mirror elements corresponding to Wide extended Graphics Array (WXGA), whose resolution is 1280 by 768, defined by VESA, the pitch between the mirrors of the mirror device is 10 μm and the diagonal length of the mirror array is about 0.6 inches.

The control circuit as illustrated in FIG. 1C controls the mirrors to switch between two states and the control circuit drives the mirror to oscillate to either the ON or OFF deflected angle (or position) as shown in FIG. 1A. The minimum quantity of light controllable to reflect from each mirror element for image display, i.e., the resolution of gray scale of image display for a digitally controlled image display apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling an SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the Pulse Width Modulation (PWM) control mechanism, the minimum quantity of light that determines the resolution of the gray scale is a brightness controlled by using the "least significant bit" for holding the mirror at an ON position during a shortest controllable length of time.

In a simple example with n-bit word for controlling the gray scale, one frame time is divided into $(2n-1)$ equal time slices. If one frame time is 16.7 msec., each time slice is $16.7/(2n-1)$ msec.

With the minimum controllable time length set for each pixel in each frame of the image, the quantity of light projected for a pixel is quantified as "0" time slice when a pixel is black with the quantity of light set at zero. The image pixel projected with a "1" time slice is the quantity of light represented by the LSB. The image pixel projected with 15 time slices, in the case of n=4, is the quantity of light represented by the maximum brightness. Based on the above-quantified light, the length of time that the mirror is held at the ON position during one frame period is determined by each pixel. Thus, each pixel controlled by a quantified value greater than "0" time slice, the mirror is held at the ON position according to the number of time slices corresponding to its quantity of light during one frame period. The viewer's eyes integrate the brightness of each pixel as if the image were generated with analog levels of light.

For controlling the deflectable mirror devices, the PWM applies the data formatted into "bit-planes". Each bit-plane corresponds to a bit weight of the quantity of light. Thus, when the brightness of each pixel is represented by an n-bit value, each frame of data has the n-bit planes. Then, each bit-plane has a "0" or "1" value for each mirror element. According to the PWM control scheme as described in the preceding paragraphs, each bit-plane is independently loaded and the mirror elements are controlled on the basis of bit-plane values corresponding to the value of each bit within one frame. Specifically, the bit-plane according to the LSB of each pixel is displayed as a "1" time slice.

Artifacts are shown between adjacent image pixels when adjacent image pixels are displayed with a great differences of quantity of light applying the gray scales having very coarse gray scales. That leads to the degradations of image qualities. The degradations of image qualities are specially pronounced in bright areas of image when there are "bigger gaps" of gray scale, i.e. quantity of light, between adjacent image pixels. The artifacts are caused by a technical limitation that the digitally controlled image display is not controlled by a sufficient number of gray scales, i.e. the levels of the quantity of light. Such problems are particularly caused by the fact that the mirrors are controlled either at the ON or OFF position. The quantity of light of a displayed image is determined by the length of time each mirror is held at the ON position. In order to increase the number of levels of the quantity of light, the switching speed of the ON and OFF positions for the mirror must be increased. Consequently, the digital control signals are required to have a higher number of bits. However, when the switching speed of the mirror deflection is increased, a stronger hinge for supporting the mirror is necessary to sustain a required number of switches of the ON and OFF positions for the mirror deflection. Furthermore, a higher voltage applied to the electrode is required in order to drive the mirrors provided with a strengthened hinge to the ON or OFF position. The higher voltage may exceed twenty volts and may even be as high as thirty volts. The mirrors produced by applying the CMOS technologies probably is not appropriate for operating the mirror at such a high range of voltages, and therefore the DMOS mirror devices may be required. In order to achieve a control of a higher number of gray scales, a more complicated production process and larger device areas are required to produce the DMOS mirror. Conventional mirror are therefore faced with a technical difficulty that in order to produce image display device with smaller size it may be necessary to sacrifice high quality of image display with a higher level of gray scales due to a higher range of the operable voltages.

There are many patents related to the methods and device configurations to control of quantity of light. These patents include the U.S. Pat. Nos. 5,589,852, 6,232,963, 6,592,227, 6,648,476, and 6,819,064. There are further patents and patent applications related to different sorts of light sources include the U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of the gray scales in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties.

In view of the above problems, an invention has disclosed a method for controlling the deflection angle of the mirror to express higher number of gray scales of an image in a US Patent Application 20050190429. In this disclosure, the quantity of light obtained during the oscillation period of the mirror is about 25% to 37% of the quantity of light obtained during the mirror is held on the ON position at all times. According to the improved control schemes, it is no longer necessary to drive the mirror at high speed. Therefore, it is possible to provide a higher number of the gray scale while supporting the mirrors with mirror hinges having a low elastic constant thus reducing the voltages applied to the electrode(s) for controlling the mirrors The image display apparatuses implemented with the mirror device described above can be broadly categorized into two types, i.e. a single-plate image display apparatus equipped with only one spatial light modulator, and a multi-plate image display apparatus equipped with a plurality of spatial light modulators. In the single-plate image display apparatus, a color image is displayed by periodically changing the colors of light. In a multi-plate the image display apparatus, a color image displayed by applying each of the spatial light modulators to modulate beams of light having different colors and continuously combining and projecting the modulated beams of different colors from each of these light modulators.

Recently, image display apparatuses of higher resolutions such as a full high-definition (Full HD) image display with 1920 by 1080 pixels are required. These requirements demand further design and development improvements of the image display systems in order to satisfy the requirements of a higher resolution display.

A mirror device used in such a display apparatus is generally implemented with a mirror array that includes two- to eight-million mirror-elements arrayed as two-dimensional array on a device substrate. The mirror element of a typical mirror device is a square-shaped mirror with each side having a length of approximately 11 μm. A memory cell for driving the mirror is formed near the mirror element on the substrate. The mirror is controlled by setting the operating voltage of the memory cell, or the drive voltage for deflecting the mirror, to "5" volts or higher to deflect the mirror element supported on an elastic hinge.

A typical mirror device implemented for a full high definition (Full-HD) image display system has micromirrors that has a diagonal size of 24.13 mm (0.95 inches) and a mirror pitch of 11 μm. The micromirrors implemented for a XGA display system has a diagonal size of 17.78 mm (0.7 inches) and a mirror pitch of 14 μm.

FIG. 2 is a diagonal view of a mirror device formed as two-dimensional micromirror array on a device substrate with each of the mirror elements controlled to deflect to different angles thus controlling a reflection direction of incident light.

The mirror device 200 shown in FIG. 2 includes a plurality of mirror elements 300. Each mirror element is supported on an elastic mirror hinge and controlled by a voltage applied to the address electrode (not specifically shown). The mirror elements are configured as two dimensional mirror array on a device substrate 303. FIG. 2 shows a plurality of mirror elements 300 wherein each mirror element includes a square mirror 302 and these mirror elements are configured with equal gaps between adjacent mirrors as two-dimensional array on the device substrate 303. The mirror 302 is controllable by applying a voltage to the address electrode disposed on the device substrate 303. FIG. 2 shows a deflection axis 201 for deflecting the mirror 302 as that indicated by the dotted line. The light emitted from a light source 301 is incident to the mirror 302 along an orthogonal or diagonal direction relative to the deflection axis 201. The distance between the deflection axes 201 between adjacent mirrors 302 is defined as the "pitch" and the distance between adjacent mirrors 302 is defined as the "gap".

Specific descriptions of mirror operation are provided below by referring to the cross-sectional line II-II of the mirror element 300 of the mirror device 200 shown in FIG. 2. FIGS. 3A and 3B are cross-sectional diagrams of the line II-II indicated in FIG. 2.

The mirror element 300 comprises a mirror 302, an elastic hinge 304 for supporting the mirror 302, two address electrodes 307a and 307b. The address electrodes are placed on two opposite sides across the mirror 302. The mirror element further includes a first memory cell and a second memory cell both for applying a voltage to the address electrodes 307a and 307b in order to control the mirror 302 under a desired deflection state.

The drive circuits for each memory cell are commonly formed in the device substrate 303 to control each memory cell in accordance with the signal of image data. The control signals are applied to modulate the mirror element for controlling the deflection angle of the mirror 302.

FIG. 3A is a cross-sectional diagram of a mirror element 300 controlled to operate in an ON state for reflecting incident light to a projection optical system by deflecting the mirror 300.

When a signal [0, 1] is applied to a memory cell, a voltage "0" (volts; "V") is applied to the address electrode 307a on one side and a voltage of Va (V) is applied to the address electrode 307b on the other side. As a result, the mirror 302 is drawn by a coulomb force to deflect from the horizontal state toward the direction of the address electrode 307b with a voltage Va (V) applied thereto. This causes the incident light emitted from a light source 301 to reflect to the projection optical system on the mirror 302 (i.e. the ON light state). Note that an insulation layer 306 is coated onto the device electrode 303, and a hinge electrode 305 connected to the elastic hinge 304 is grounded through a via connector (not specifically shown) placed in the insulation layer 306.

FIG. 3B is a cross-sectional diagram of a mirror element 300 operated in an OFF state as the incident light is reflected away by deflecting the mirror 302 from the image projection path. When a signal [1, 0] is applied to a memory cell, a voltage Va (V) is applied to the address electrode 307a on one side and a voltage of "0" (V) is applied to the address electrode 307b on the other side. As a result, the mirror 302 is drawn by a coulomb force to deflect from the horizontal position toward the direction of the address electrode 307a with a voltage Va (V) applied thereto. This causes the incident light to reflect away from the image projection light path thus controlling the mirror to operate in an OFF light state.

Incidentally, the Coulomb force generated between the mirror 302 and address electrode 307a, or 307b, is expressed by the following expression:

$$F = k' \frac{eS^2 V^2}{2h^2};\quad (1)$$

where "S" is the area size of the address electrode 307a or 307b, "h" is the distance between the mirror 302 and address electrode 307a or 307b, "e" is the permittivity between the mirror 302 and address electrode 307a or 307b, "V" is the voltage applied to the address electrode 307a or 307b, and "k'" is a correction coefficient.

FIG. 4 is a cross-sectional diagram for showing the optical paths of the incident light projected to a mirror device 200. In the mirror device 200 shown in FIG. 4, each of the mirror elements 300 includes a mirror 302 supported by a hinge 304 juxtaposed on the device substrate 303 contained in a package 308. The package 308 is in the shape of a hollow rectangle with an open top and the top is covered with a cover glass 309 allowing the transmission of light.

The mirror device as described above can usually be produced by applying the production process of a semiconductor device. The production process mainly includes chemical vapor deposition (CVP), photolithography, etching, doping and chemical mechanical polishing (CMP).

Incidentally, in order to satisfy the requirements of projecting image from a projection apparatus with a higher resolution, the number of mirror elements must be increased thus requiring a miniaturization of the mirror size of the mirror element.

As a consequence of the miniaturization requirement for the mirror, the elastic hinge must also be formed to have extremely thin and small size. The hinges are typically formed with approximately 100- to 1000 angstrom thick and 1.2- to 0.3 μm wide. The elastic hinge is therefore attached onto the address electrode on a very small area thus making it very difficult to fix the elastic hinge robustly on the substrate. It becomes difficult to prevent the hinge from being detached when an elastic force is applied to the root part of the hinge. Furthermore, a perpendicular elastic hinge actually functions as cantilevered spring that requires the elastic hinge to attach to the substrate only on the bottom portion of the hinge and the bottom attachment must therefore able to endure a large force.

Further, when forming an elastic hinge, the etching processes are repeatedly applied, and therefore a caution must be paid to prevent the bottom portion near the root part of the elastic hinge from cut or corroded. Incidentally, in the case in which the sacrifice layer is made of silicon dioxide (SiO$_2$), hydrogen fluoride (HF) is used as etchant, and therefore the root part and fixed part of an elastic hinge may easily be cut and/or corroded. Therefore, technical difficulties and challenges are encountered by those of ordinary skill in the art to provide new and improved processes and device configuration in order to overcome such problems.

The following lists the patent numbers related to the structures of the conventional mirror devices and the techniques for producing the mirror devices. U.S. Pat. No. 7,183,618: This publication has disclosed a hinge formed in the opening part of a pedestal. U.S. Pat. No. 7,273,693: This publication has disclosed a mirror device comprising a mirror support. U.S. Pat. Nos. 5,673,139; 6,128,121; and 7,068,417. Each of these publications has disclosed a vertical hinge. U.S. Pat. No. 7,022,249: This publication has disclosed a method for forming the root of a hinge. U.S. Pat. No. 5,497,262: This publication has disclosed a horizontal hinge structure.

These patented and published disclosures related to the mirror device and hinge configurations and structures, however do not provide improved methods and device configurations to resolve the above discussed difficulties and limitations.

SUMMARY OF THE INVENTION

In consideration of the difficulties and limitation of the conventional technologies, an aspect of the present invention is to provide a manufacturing method and improved configurations of the mirror device with micromirrors supported by elastic hinges that are robustly fixed for reliably sustaining long term operations.

According to the present invention, a mirror device comprises: a mirror; an electrode which is placed on a substrate and on which surface a cavity is formed; and a hinge placed between the mirror and electrode, wherein the hinge is securely attached to the cavity of the electrode.

It is another aspect of the present invention that another embodiment of a mirror device comprises: a mirror; a fixing part which is placed on a substrate and which is connected to a wiring part; a hinge connected to the fixing part, wherein the hinge and fixing part are three-dimensionally interconnected and securely attached thereon.

Further according to the present invention, yet another embodiment of a mirror device comprises a substrate having a wiring circuit; an electrode which is connected to the wiring circuit and in which at least a part of the electrode is positioned at an opening part formed on the substrate and wiring circuit; and a micro-electrical mechanical system (MEMS) structure connected to the electrode, wherein at least a part of the MEMS structure connected to the electrode is connected at a height different from that of the surface of the electrode.

DESCRIPTION OF THE PREFERRED EMBODIMENTS

A mirror device implemented in a projection apparatus according to a preferred embodiment of the present invention is described below by referring to the accompanying drawings.

FIGS. 5A through 5F are cross-sectional diagrams for describing the processing steps for producing a mirror device according to a preferred embodiment of the present invention.

Figure 1A:
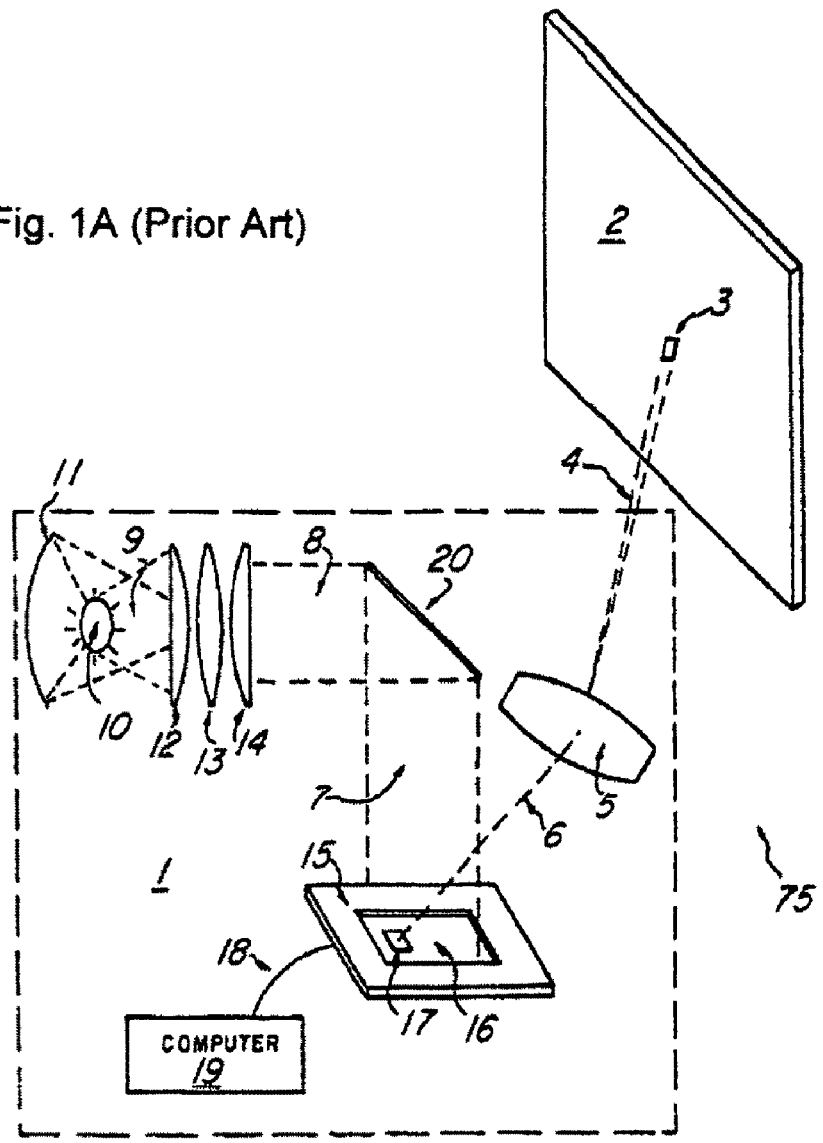
FIG. 1A shows a related art illustrating the basic system diagram of a projection display using a micromirror device.
Figure 1B:
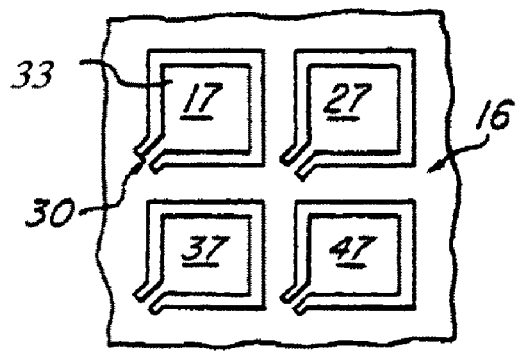
FIG. 1B shows a top view of mirrors a micromirror device used for an image display system.
Figure 1C:
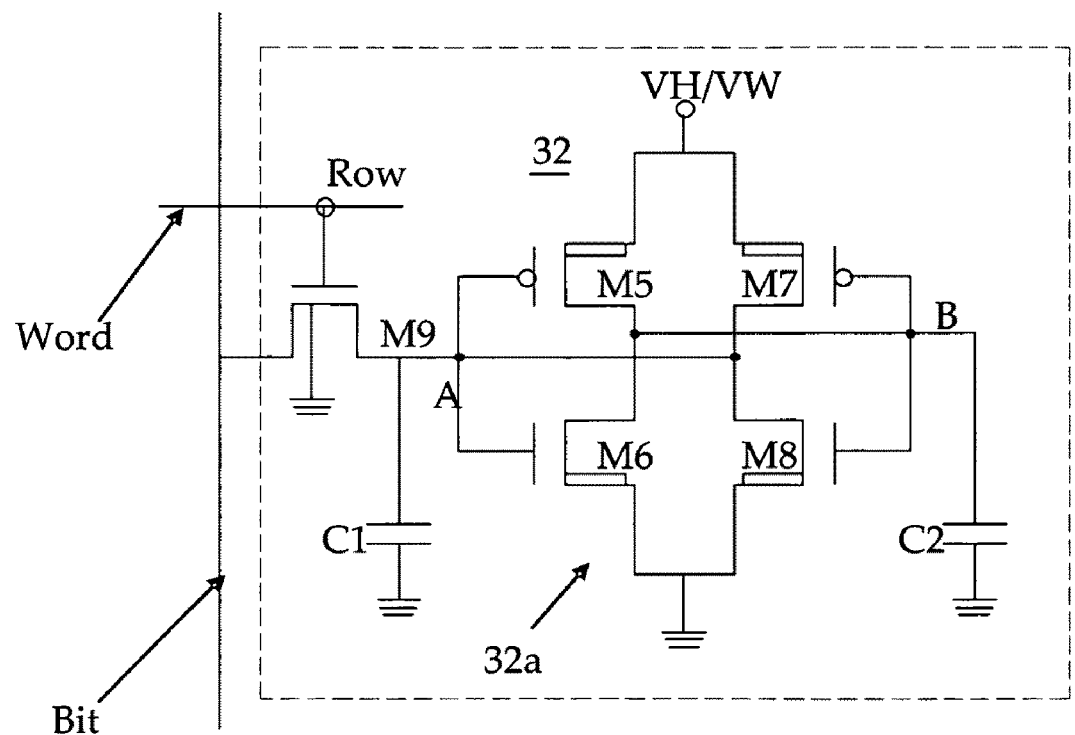
FIG. 1C is a control circuit diagram for controlling and driving a conventional micromirror device used for an image display system.
Figure 1D:
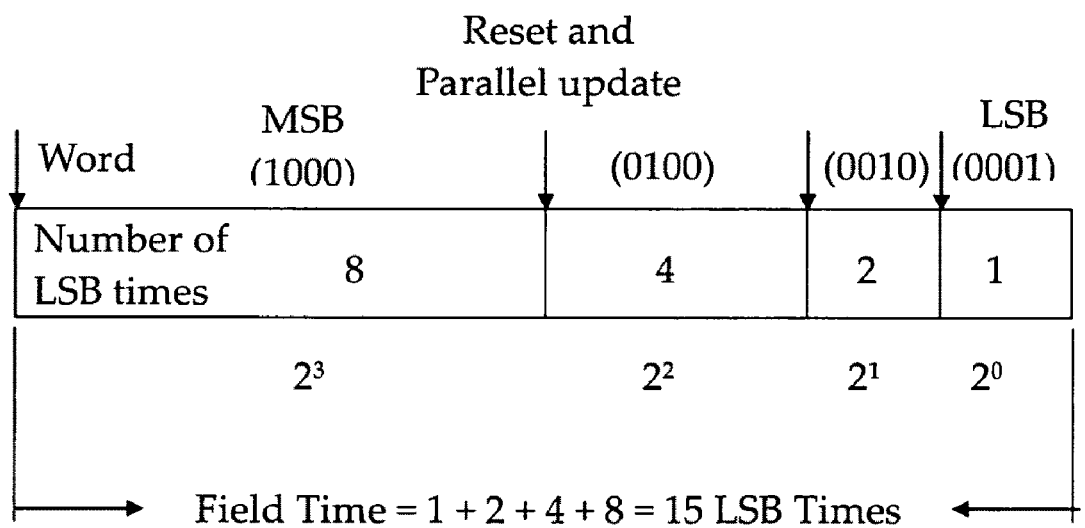
FIG. 1D shows the scheme of Binary Pulse Width Modulation (Binary PWM) of a conventional digital micromirror to generate grayscales for image display.
Figure 2:
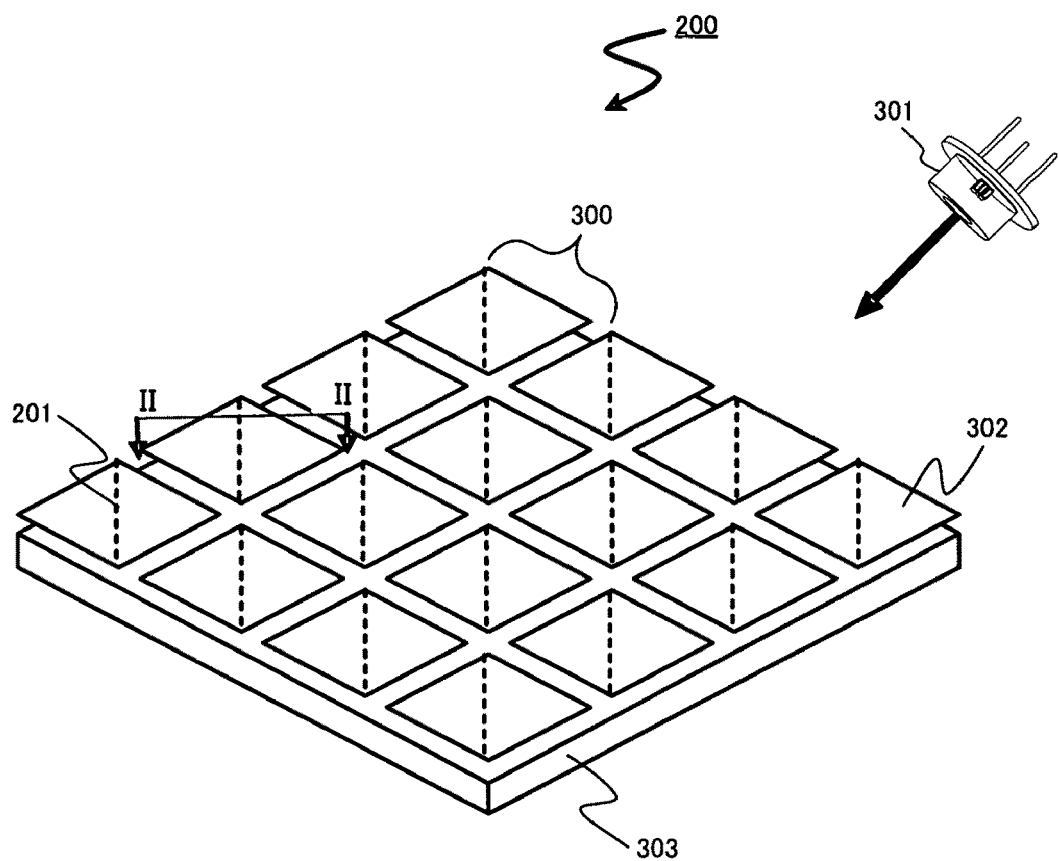
FIG. 2 is a diagonal view of a mirror device arraying, in two-dimension on a device substrate, mirror elements controlling the reflection direction of incident light by deflecting the mirror.
Figure 3A:
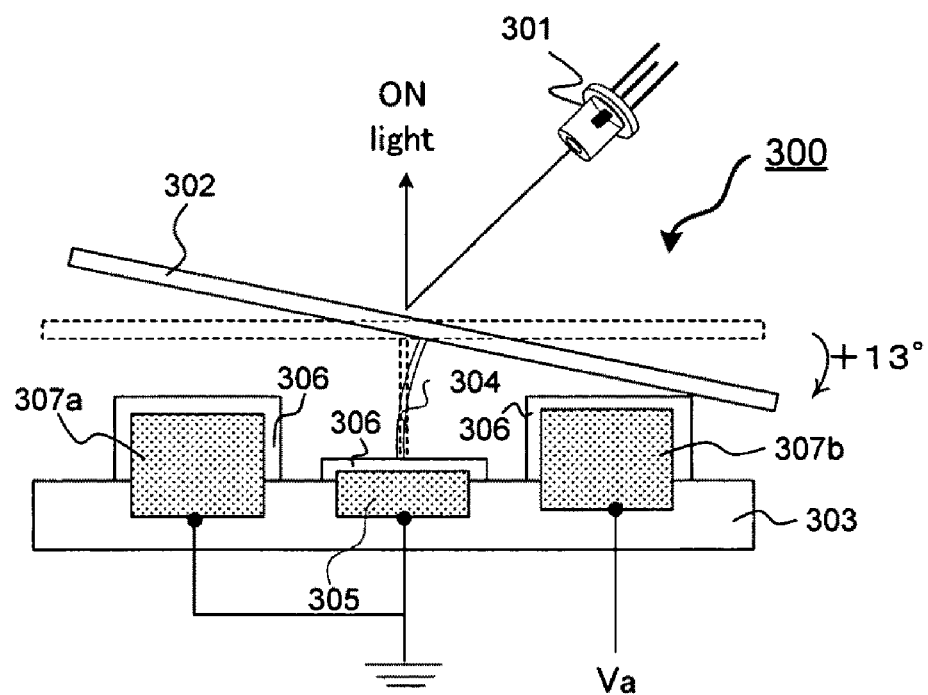
FIG. 3A is a cross-sectional diagram of a mirror element reflecting incident light to a projection optical system (i.e., an ON light state) by deflecting the mirror.
Figure 3B:
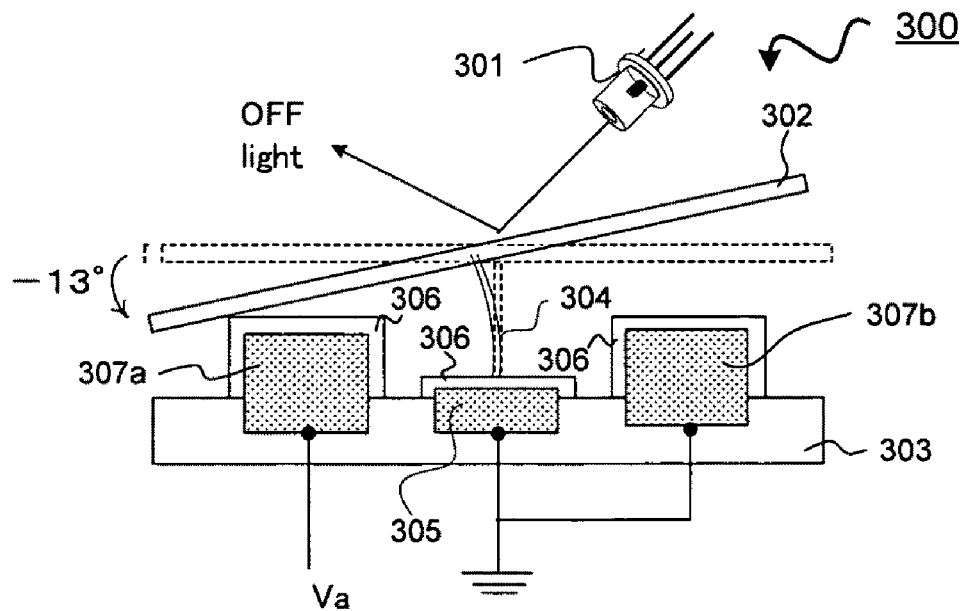
FIG. 3B is a cross-sectional diagram of a mirror element not reflecting the incident light to the projection optical system (i.e., an OFF light state) by deflecting the mirror.
Figure 4:
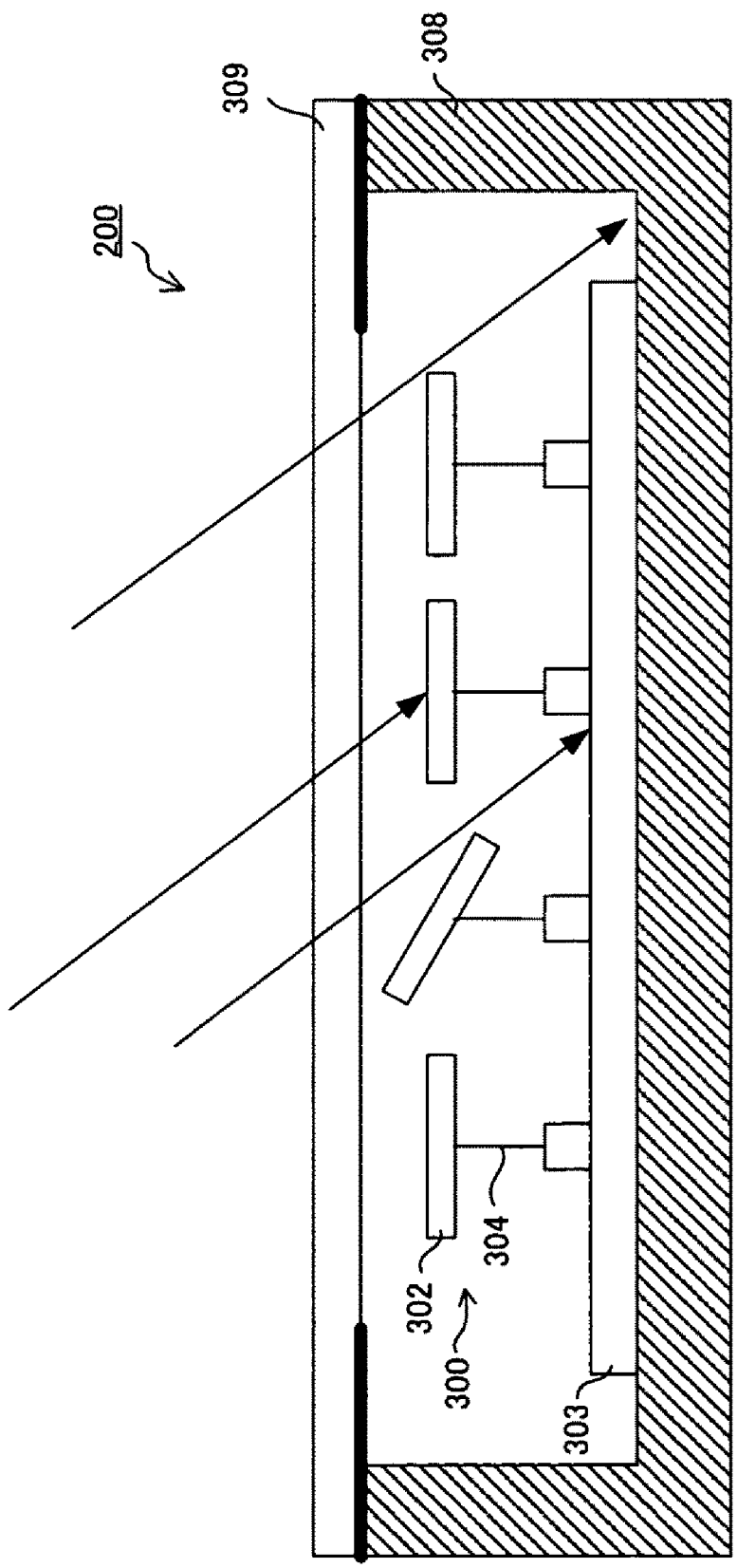
FIG. 4 is a cross-sectional diagram for illustrating the incident light projected into a mirror device.
Figure 5A:
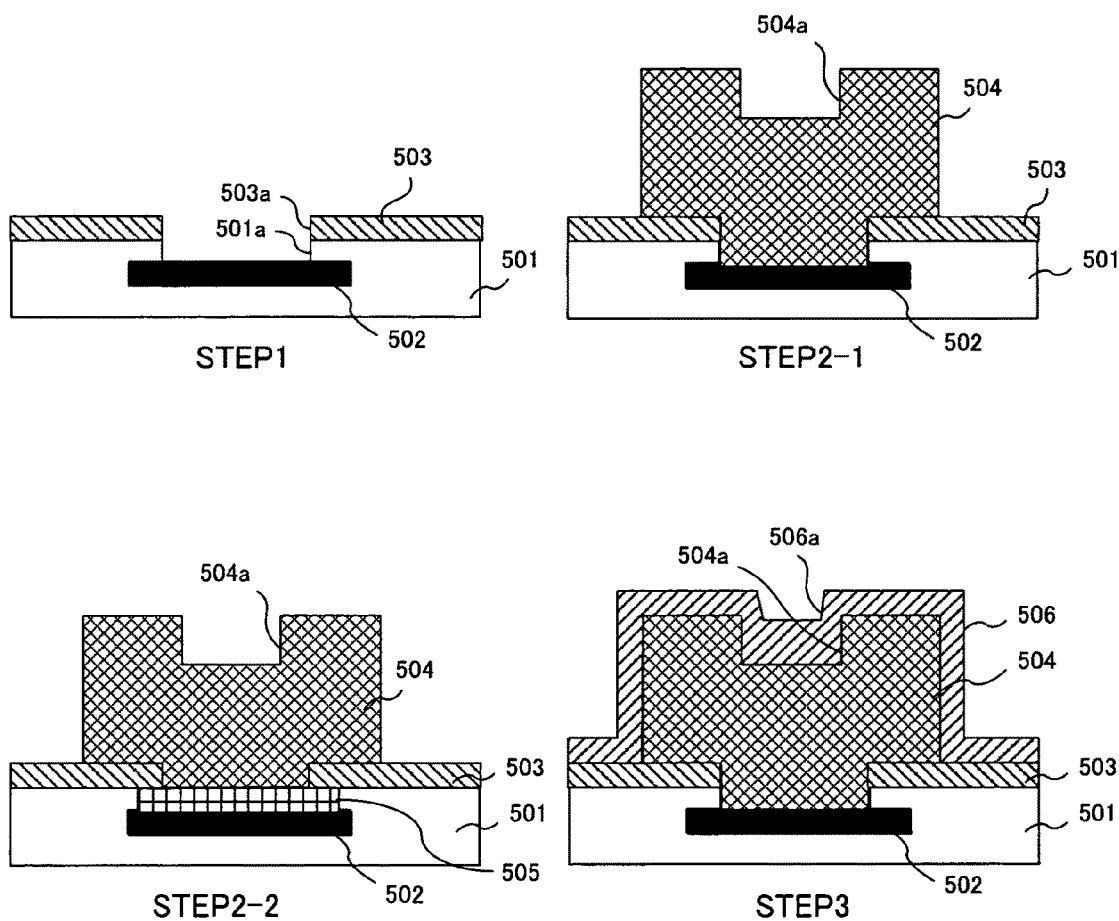
FIG. 5A is a cross-sectional diagram for illustrating the processing steps for producing a mirror device according to a preferred embodiment of the present invention (part 1).

FIG. 5A shows the step 1 to form a wiring 502 of a drive circuit for driving and controlling a mirror (which is described later) in a semiconductor wafer substrate (simply noted as "substrate" hereinafter) 501. A cavity as an opening part (i.e., a cavity or concave part) 501a is opened from a top surface of the substrate 501 and extends to the upper surface of the wiring 502 preferably composed of aluminum. A first protective layer, i.e., a protective film, 503 is deposited on the parts of the substrate 501 except for the opening part 501a. The first protective layer 503 is deposited before the opening part 501a of the substrate 501 is formed. An opening part 503a on the same area size as the opening part 501a is also formed as the side surface of the first protective layer 503. The first protective layer 503 is a layer for preventing the wiring 502 from corroded with hydrogen fluoride (HF) when the hydrogen fluoride (HF) is applied to remove the sacrifice layer as described later.

Note that the substrate 501 shown in FIGS. 5A through 5F comprises an insulation layer deposited on the upper part of a silicon substrate (not specifically shown). The substrate 501 as an insulation layer and the first protective layer 503 each is preferred to have structure comprising layers composed of amorphous silicon with a double-layer structure consisting of an amorphous silicon and silicon carbide (SiC) or a double layer structure that includes silicon such as silicon carbide (SiC) and silicon dioxide ($SiO_2$).

In step 2-1, an electrode 504 is formed over the first protective layer 503 covering the surfaces of the opening parts 501a and 503a at the center and filling the cavity to contact the wire 502. In this electrode deposition process, the electrode 504 is deposited to the opening parts 501a and 503a, and filling the cavity as an opening part thus forming a top concave portion 504a on the upper surface near at the center of the electrode 504. Note that the electrode 504 is formed as an electrode to have a three-dimensional connection to a microelectrical mechanical system (MEMS) structure. As will be further described below, the present embodiment is configured to fabricate an elastic hinge as constitutes a MEMS structure. Further, the electrode 504 is formed for connection to one end of the elastic hinge as a part of the side surface and bottom surface of the elastic hinge fabricated as a MEMS structure.

In an exemplary embodiment, the electrode 504 is composed of an aluminum material containing silicon (Si). The electrode 504 can therefore prevent an occurrence of migration between the electrode 504 and elastic hinge because the electrode 504 functions as a support for firmly supporting and stabilizing the elastic hinge as will be further described in detail later.

In this exemplary embodiment, when aluminum is used to form the electrode 504 on the insulation layer covered with the first protective layer both composed of amorphous silicon, the aluminum electrode 504 is corroded when the aluminum electrode 504 contacts with these layers. Therefore, a preferred configuration is to form a silicon carbide (SiC) layer between the amorphous silicon layer and the aluminum electrode 504. Alternatively, it is preferable to form the electrode 504 with a mixture of aluminum with impurity such as silicon (Si). One or two barrier layers composed of a material other than a silicon carbide (SiC) layer may also suppress a corrosion of the electrode 504.

In order to form a plurality of electrodes simultaneously in one processing step, the height of the electrode 504 is made the same as that of one or more electrodes placed under the end of a mirror (not shown in a drawing herein).

After the electrode 504 is deposited on the substrate 501 in step 2-1, a test of the drive circuit is carried out confirm the proper functioning of the drive circuit and/or the normal electrical connectivity of the electrode 504.

Note that the electrode 504 is formed on the wiring 502 in step 2-1; it is also conceivable to form a Via (i.e., an intermediate layer or a connection part) 505 between the wiring 502 and electrode 504 as shown in step 2-2. The Via 505 is preferably composed of an electrically conductive material such as metallic material containing tungsten, cooper or aluminum and to have a horizontal cross-sectional area size smaller than that of the electrode 504.

A second protective layer 506 is formed in step 3. The second protective layer 506 is deposited on the upper part of the electrode 504 and first protective layer 503. The second protective layer 506 also forms a concave part 506a on top of the concave part 504a of the electrode 504. The thickness of the second protective layer 506 is preferably in a range between 500- to 3000 angstroms. When the protective film has a thickness of 1000 angstroms or more, the protective layer absorbs the light before the light reaches the substrate. The influence of a photoelectric effect on the circuit formed in the substrate is reduced. Blue light is attenuated to about 5% at 500 angstroms, while green light is attenuated to about 5% at 1000 angstroms. Red light is attenuated to 10% or less at 2000 angstrom. Furthermore, a smaller the gap between mirrors reduces a projection of the illumination light to the substrate through the gaps thus further reduces the photoelectric effect. Additionally, as the area size of the reflection surfaces is increased, the quantity of reflection light from the mirror is also increased and the brightness of the projected images is further improved. The reflection surface of mirrors is preferred to occupy 80% or more and preferably up to 90% of the total areas of the regions occupied by the mirror array of Moreover, the reflectance of a mirror is adversely affected when a mirror comprises a single aluminum layer having a thickness about 300 Angstroms due to the fact that the illumination light transmits through the thin aluminum layer. The thickness of the aluminum layer is preferably 600 angstrom or even more. Further consideration of the variations in the production processes and the flatness of the mirror, the thickness of aluminum is preferably 1500 angstroms up to 3000 angstroms for a single reflective layer composed of aluminum.

Specifically, the deposition of the second protective layer 506 is processed at 380- to 400° C. by applying silane and argon (SiH4+Ar) in a plasma-enhanced CVD (PECVD) process to form a layer covering over the amorphous silicon as a semiconductor material. Note that the chemical vapor deposition is a method for depositing a film utilizing a chemical catalytic reaction by supplying a gaseous material in accordance with the type of the sacrifice layer. The second protective layer 506 may be formed into a plurality of layers together with a protective layer that may include a material such as silicon carbide (SiC).

Figure 5B:
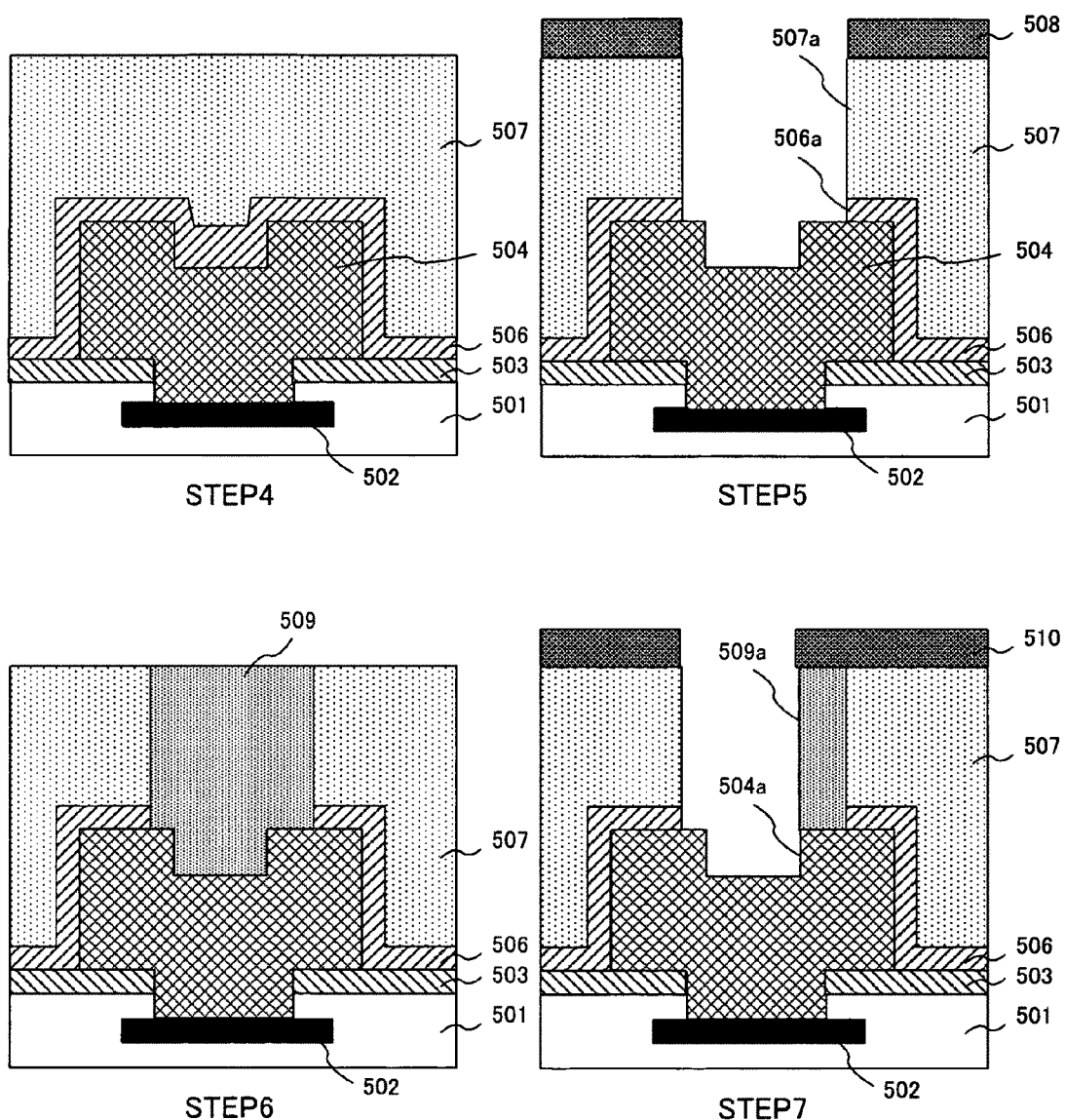
FIG. 5B is a cross-sectional diagram for illustrating the processing steps for producing a mirror device according to a preferred embodiment of the present invention (part 2).

In step 4 shown in FIG. 5B, a first sacrifice layer 507 is formed. The first sacrifice layer 507 is deposited at 400° C. by using silane, oxygen and argon (SiH4+O2+Ar) in a high-density plasma (HDP)-PECVD process and is formed as a layer of oxide. The height of the first sacrifice layer 507 is determined based on a configuration that the upper part of an elastic hinge as described later will be deposited on the first sacrifice layer 507.

In step 5, a first photoresist layer 508 is formed by applying a spin coating on the sacrifice layer 507. Then, an etching process is carried out to open a hole through the first sacrifice layer 507, the second protective layer 506, and extends to the concave part 504a of the electrode 504. The hole is surrounded by sidewalls 506a, 507a and the sidewalls 504a of the concaved top of the electrode 504.

In the etching process, the hole 507a is formed in the first sacrifice layer 507 by applying an etchant gas of octafluorocyclobutane ($C_4F_8$) and carbon monoxide (CO) to carry out a reactive ion etching (RIE). Furthermore, if the second protective layer 506 is formed as a silicon (Si) layer, the etching process is carried out with the gas of hydrogen bromide (HBr) and chlorine (Cl). With the second protective layer 506 contains silicon carbide (SiC), an etching process is carried out by using tetrafluoromethane, oxygen and argon ($CF_4+O_2+Ar$) to form the hole 506a by a RIE process in the second protective layer 506.

In step 6, a second sacrifice layer 509 is deposited into the hole surrounded by the sidewalls 506a and 507a of the second protective layer 506 and first sacrifice layer 507 and in the concave part 504a of the electrode 504. The process proceeds by applying a chemical mechanical polishing (CMP) process to remove the sacrifice layer 509 from above the top surface surrounding the hole.

In step 7, a second photoresist layer 510 is formed to carry out an etching process to remove a portion of the second sacrifice layer 509. Another portion of the second sacrifice layer 509 covered under the photoresist 510 is kept and shown as a column 509a.

As will be further described below that an elastic hinge will be extended perpendicularly upward from the concave part 504a of the electrode 504 along the un-removed part 509a, of the second sacrifice layer 509. Therefore, the height and size of the column 509a are determined in accordance with the dimension, i.e., the height, of the elastic hinge.

Figure 5C:
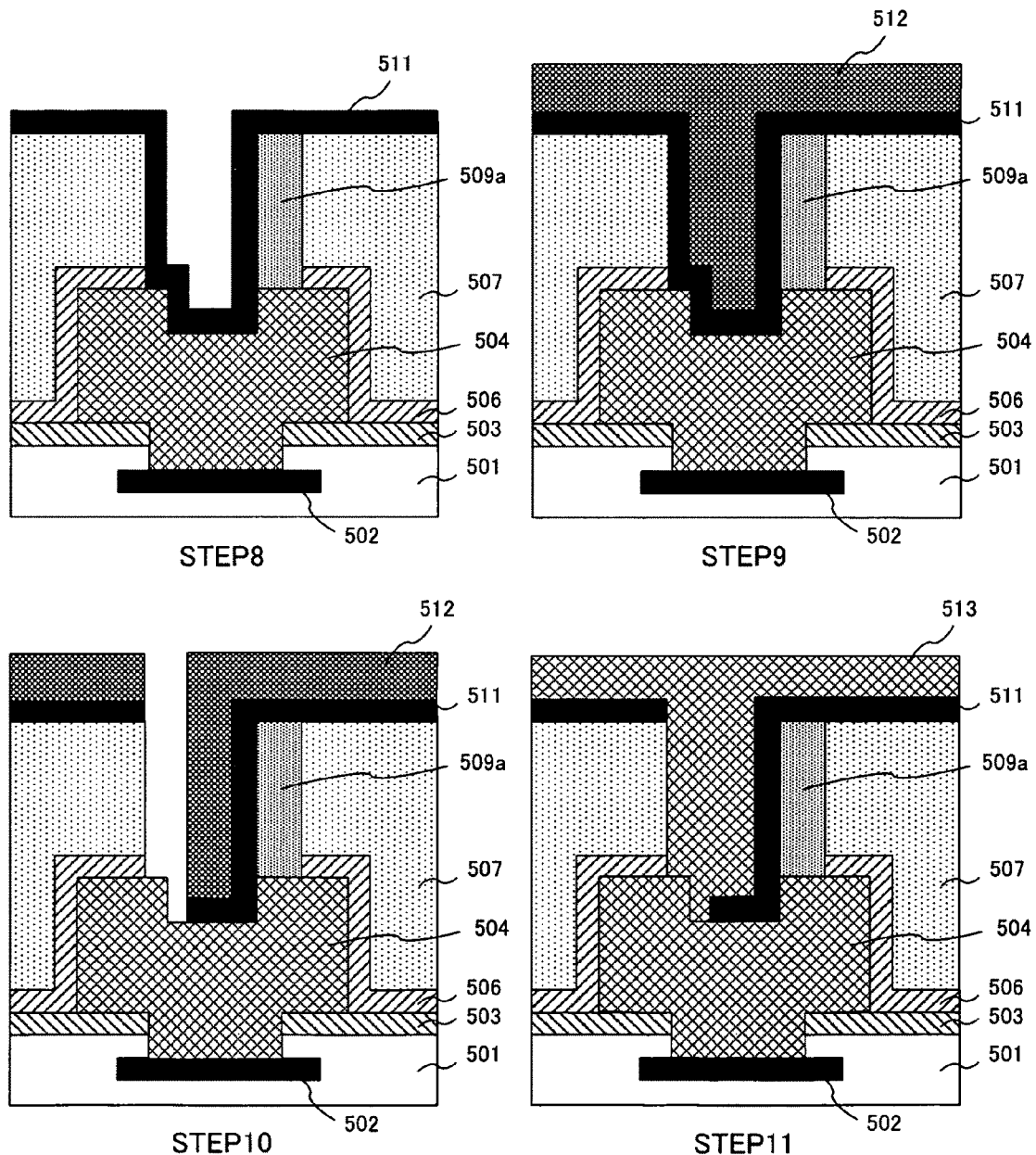
FIG. 5C is a cross-sectional diagram for illustrating the processing steps for producing a mirror device according to a preferred embodiment of the present invention (part 3).

In step 8 shown in FIG. 5C, a hinge layer 511 is deposited at 380- to 400° C. by using SiH4+Ar by applying a PECVD deposition process. In different exemplary embodiments, the thickness of the hinge layer 511 is between 100- and 1000 angstroms in consideration of a spring force for deflecting a mirror and the electrical resistance of the hinge. Generally, the thickness of the hinge layer 511 is no more than 500 angstroms and preferably between 150- and 500 angstroms.

Figure 5D:
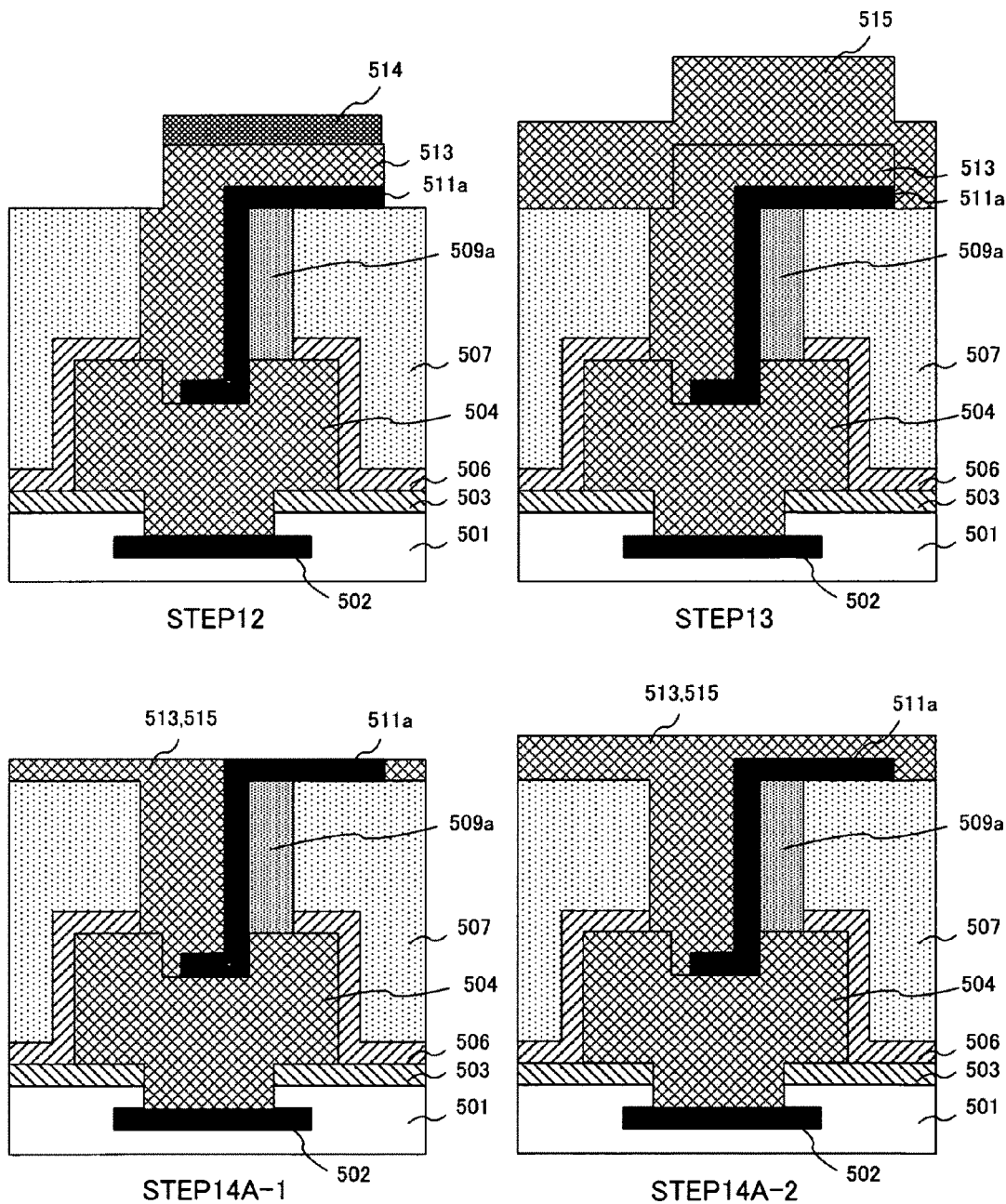
FIG. 5D is a cross-sectional diagram for illustrating the processing steps for producing a mirror device according to a preferred embodiment of the present invention (part 4).
Figure 5E:
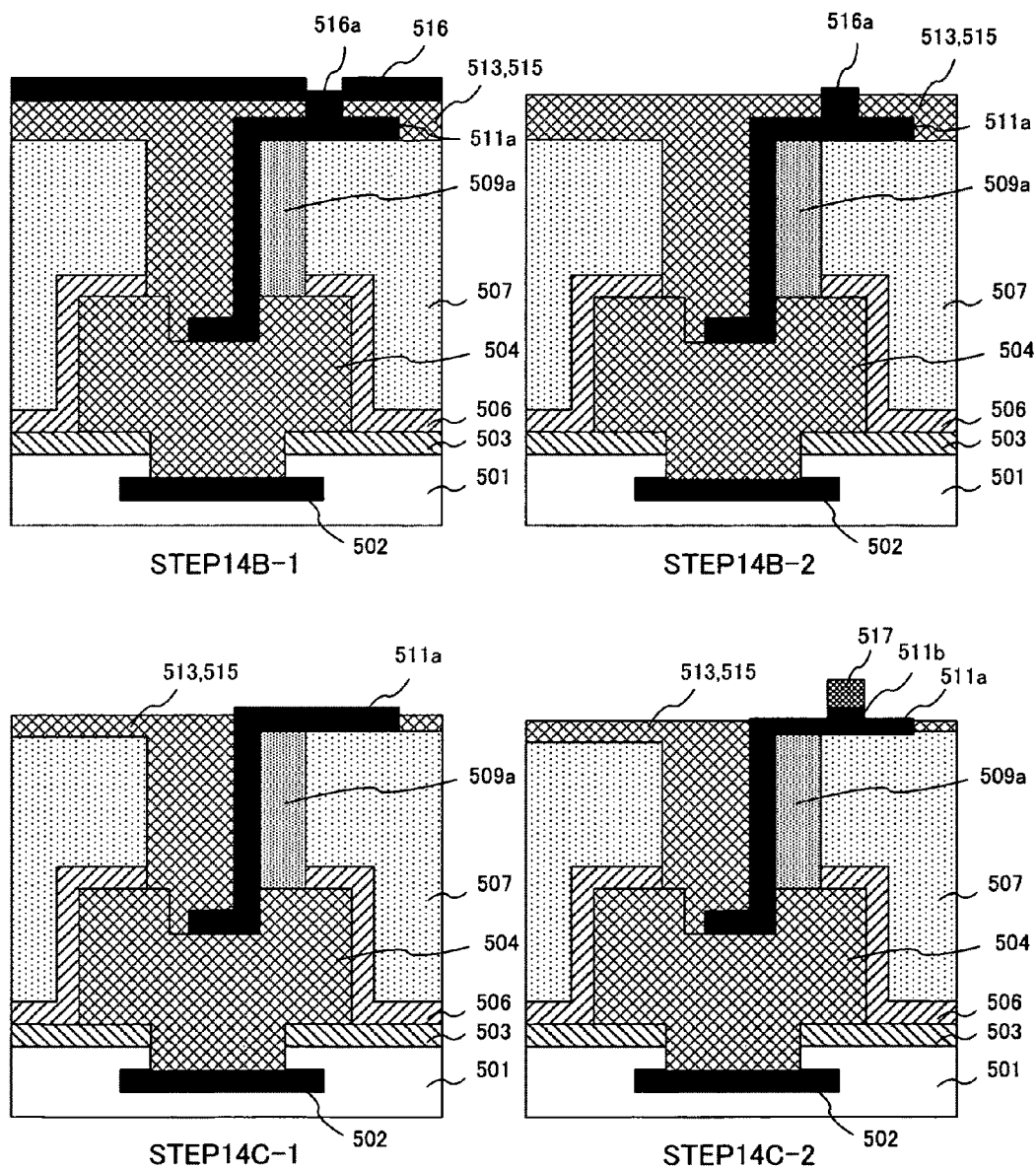
FIG. 5E is a cross-sectional diagram for illustrating the processing steps for producing a mirror device according to a preferred embodiment of the present invention (part 5).
Figure 5F:
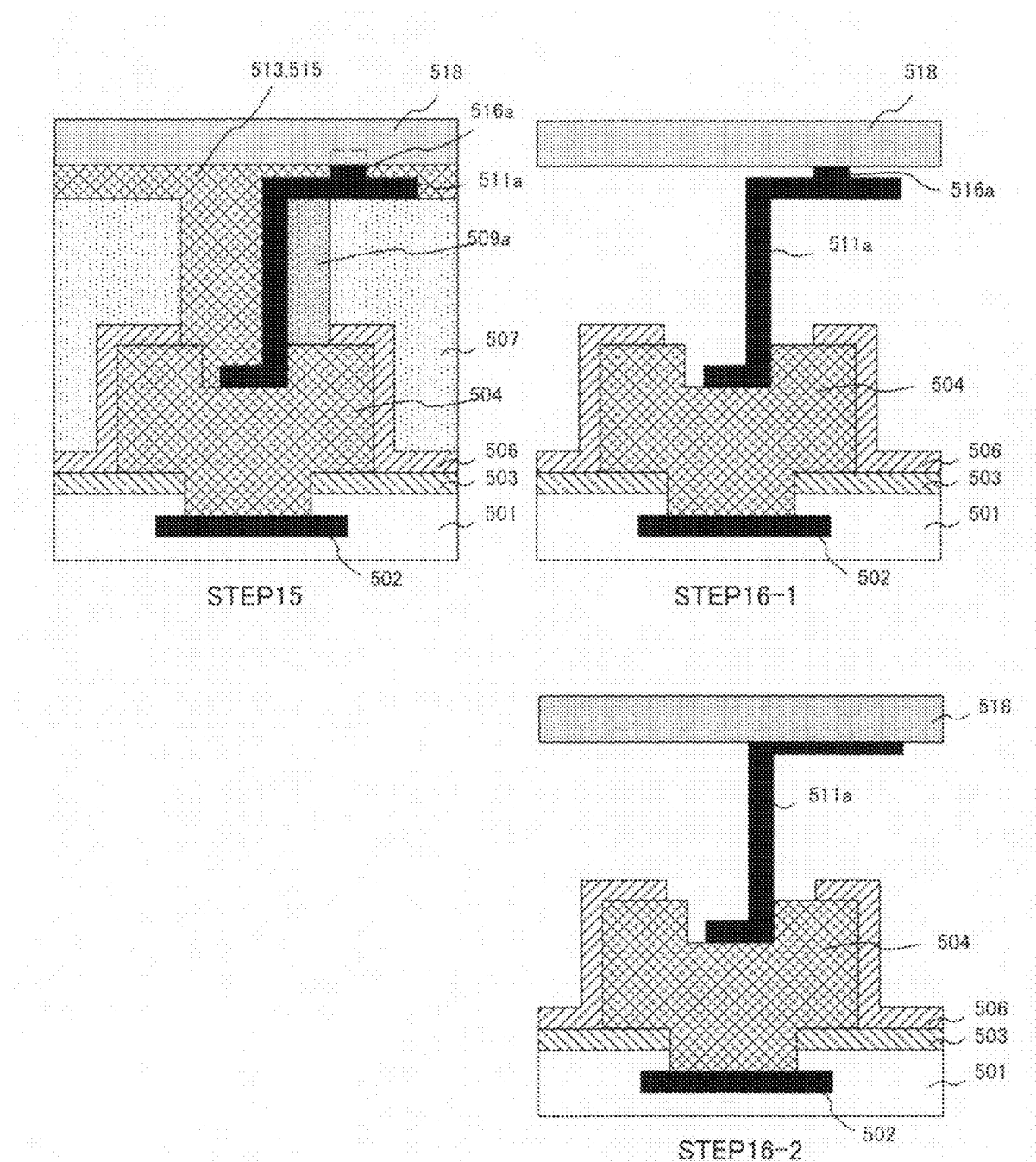
FIG. 5F is a cross-sectional diagram for illustrating the processing steps for producing a mirror device according to a preferred embodiment of the present invention (part 6).

Further, the horizontal part of the hinge layer 511, which is parallel to a mirror as will be described later provided to form a joinder part 516a thereon as shown in FIG. 5F below, is formed with a different thickness than the perpendicular part of the hinge layer 511 The horizontal part of the hinge layer 511 formed on top of the upper surface of the first sacrifice layer 507 has a thickness approximately two to four times that of the part of the hinge layer formed by deposition perpendicularly along the side walls of the second sacrifice layer 509a. The upper part of the first sacrifice layer 507 is preferably formed with a greater thickness because the hinge formed in this section will have smaller elastic deformation. A greater thickness in the upper part of the first sacrifice layer 507 will also provide a benefit that the formation of a joinder part 511b can be more conveniently carried out.

The deposition of the hinge layer 511 may be performed with any of the materials such as single crystal silicon, poly-silicon and amorphous silicon, which are doped with boron (B), arsenic (As) or phosphorous (P) as additive. Alternatively, the hinge layer 511 may be formed with materials having electrical conductivity by applying an in-situ doping with arsenic, phosphorous and the like, by applying an ion implant or by diffusing a metallic silicide such as nickel silicide (NiSi) and titanium silicide (TiSi). Further, the hinge layer 511 may be formed by aluminum containing silicon (Si). Moreover, the hinge layer 511 may be formed by using a material the same as that of the first protective layer 503.

Additionally, there may be alternative configurations by forming the electrode 504 and hinge layer 511 by using the same material. The thermal conductivity of the electrode 504 is made higher than that of the hinge layer 511 to dissipate heat effectively from the lower part of an elastic hinge as will be described later. Furthermore, a layer made of a different material than that of the materials of the electrode 504 and hinge layer 511 is formed between the aforementioned two components.

In step 9, a third photoresist layer 512 is deposited on the hinge layer 511. In step 10, a portion of the third photoresist layer 512, which covers the upper part of the concave part 504a of the electrode 504 and the upper part of the photoresist layer 512, is removed by applying an etching process to define the head position on the lower side of an elastic hinge as described later. The processes proceed by etching off the exposed portion of the hinge layer 511 to form the elastic hinge. The etching process may use $SF_4+O_2+Ar$ by applying an RIE and an isotopic etch process. Furthermore, in step 10, the etching process is controlled such that the width of the elastic hinge with the width indicated by the width indicated in the cross-section view, ranging between 0.5- and 1.5 μm on the surface along the depth direction of the cross-sectional diagram shown in step 10.

In step 11, the third photoresist layer 512 is removed followed by depositing a third sacrifice layer 513 and smoothing out the top surface by applying a CMP process. The third sacrifice layer 513 may be formed as a tetraethoxysilane (TEOS) layer or a layer composed of similar materials.

In step 12 shown in FIG. 5D, a fourth photoresist layer 514 is formed on top of the third sacrifice layer 513 above the horizontal portion of the elastic hinge 511*a*. The location of the fourth photoresist layer 514 defines the head position on the upper side of the elastic hinge 511*a*. As will be further described below, the third sacrifice layer 513 and a portion of the hinge layer 511 will be etched off later to complete the processes to form the elastic hinge 511*a*.

The bottom surface of elastic hinge 511*a* is connected to the bottom surface of the concave part 504 of the electrode 504. The elastic hinge 511*a* further extends substantially perpendicularly from the substrate 501 and connected to the side surface of the concave part 504*a*. Therefore, the elastic hinge 511*a* is connected to the electrode 504 in three-dimension and fixed robustly onto the electrode 504.

Note that the elastic hinge 511*a* is connected to the electrode 504 disposed under the second protective layer 506. The elastic hinge 511*a* penetrates the second protective layer 506 but have no contact therewith. Further, the elastic hinge 511*a* and second protective layer 506 are placed so as to be not electrically conductive with each other after the completion of the subsequent processing steps. Note that an insulation layer may be placed between the elastic hinge 511*a* and second protective layer 506 to insulate these two components from electrically conductive with each other. When the second protective layer 506 is made of a high-resistance insulator, the elastic hinge 511*a* may be configured to contact the second protective layer 506.

In step 13, the fourth photoresist layer 514 is removed, and then a fourth sacrifice layer 515 is deposited on the top surface. Note that the first through fourth sacrifice layers may be formed by using the same material. Then, a CMP process is performed to polish the surface of the fourth sacrifice layer 515.

In step 14A-1, the elastic hinge 511*a* supported on the substrate 501 is placed near the center of a wafer, while in step 14A-2, the elastic hinge 511*a* is shown as disposed at the end of the substrate 501. With these two different configurations, depending on the CMP condition for the respective wafers the amounts of polishing are different between the center and surrounding. In step 14A-1, the CMP process is performed to polish the fourth sacrifice layer 515 and remove the layers covering over the upper surface of the elastic hinge 511*a*. Therefore, a mirror can be deposited and formed on top of the elastic hinge 511*a*. In step 14A-2, however, the fourth sacrifice layer 515 at the end of the substrate 501 and the layer 513 covering the elastic hinge 311*a* cannot be completely removed. In that case, a mirror as will be described later cannot be formed directly on top of the elastic hinge 511*a*.

Accordingly, a part of the fourth sacrifice layer 515 covering the upper surface of the elastic hinge 511*a* is removed by applying an etching process. Then a semiconductor material 516 possessing electric conductivity is deposited by applying a CVD process that is same as step 14B-1 shown in FIG. 5E to deposit the semiconductor material 516 by using a single crystal silicon (Si) or poly-silicon followed by doping with the semiconductor material with boron (B), arsenic (As) or phosphorous (P). Alternately, the semiconductor material 516 may compose of a same material as that used for the elastic hinge 511*a*.

Then, the semiconductor material 516 is removed by applying an etching process. One or at least two joinder parts such as a convex part, a conductive part and a conductive layer 516*a* are formed on the top surface after the fourth sacrifice layer 515 is removed (as shown in step 14B-2). Then, a CMP process is performed to further process by polishing the upper surfaces of the third and fourth sacrifice layers 513 and 515 and the upper surface of the joinder part 516*a*. The joinder part 516*a* is polished to have a predetermined height (e.g., 0.1 μm) in accordance with the flatness of the third and fourth sacrifice layers 513 and 515. Further, the joinder part 516*a* is formed to be smaller than a mirror 518. This configuration and the processing steps provide uniform size and dimension of the hinges and joinder parts fabricated in each region of a wafer or in each wafer and a uniform height of the mirror surface 518 is achieved.

Furthermore, as a different production method for a joinder part 516*b*, a joinder part 511*b* can be formed by depositing a fifth photoresist layer 517 on a part of the upper surface of the elastic hinge 511*a* and then applying etching process as shown in step 14C-2, starting from the state shown in step 14C-1.

In step 15 shown in FIG. 5F, following the steps 14B-1 and 14B-2 after forming the joinder part 516*a*, an aluminum surface formed as a reflective mirror 518 is sputtered onto the top surface of the layer 511*a*. The mirror 518 may be configured approximately with a square shape or a parallelogram shape in an orthogonal view. Note that the sputtering of the mirror 518 onto a top surface provided with the joinder part 516*a* projected upward from the sacrifice layers 513 and 515 makes it possible to join the joinder part 516*a* with mirror 518 in the inside surface of the mirror 518.

Then, in step 16-1 with a joinder part 516*a*, and in step 16-2 with direct mirror surface on top of the hinge 511*a*, an etch process with hydrogen fluoride (HF) gas and alcohol is applied to remove the first through fourth sacrifice layers 507, 509*a*, 513 and 515.

If the first through fourth sacrifice layers 507, 509*a*, 513 and 515 are formed by the TEOS, the first through the fourth sacrifice layers are removed with an HF gas and alcohol. The remaining foreign material and sacrifice layers can be completely removed by appropriately adjusting the densities of the hydrogen fluoride and alcohol and the processing time. Consequently, the problem of stiction due to the mirror 518 contacts with and attached to the second protective layer 506 on the electrode 504 can be prevented. Note that the first through fourth sacrifice layers 507; 509*a*, 513 and 515 may be removed after the substrate 501 is diced and separated from a large piece of wafer into individual devices. In such sequence of processes, after the wafer is first laminated with a protective layer (not specifically shown), composed of SiO2 or similar laminating material on the entire upper surface of the mirror 518 to protect the mirror surface is performed before the dicing process.

The elastic hinge 511*a* and mirror 518 are formed on the substrate 501 and electrically conductive to a drive circuit (not shown) and the electrode 504. The drive circuit transmits control signals to the electrode to control and deflect the mirror 518.

Furthermore, a light shield layer as an antireflective layer for suppressing the reflection light from the surface of the protective layer 506 may be coated on the surface of the protective layer 506. The antireflective light shield layer may be a coated layer, which does not influence the resistance value of the elastic hinge 511a.

Meanwhile, there is an anti-stiction countermeasure process for preventing a moving part (mainly a mirror) from sticking to the stopper part of an electrode to prevent an operation failure. The anti-stiction member may be provided by laminating a monolayer of perfluorooctyltrichlorosilane ($CF_3(CF_2)_5(CH_2)_2SiCl_3$; PFOTS), perfluorooctyldimethylchlorosilane ($CF_3(CF_2)_5(CH_2)_2Si(CH_3)_2Cl$; PFODCS), or perfluorodecyldimethylchlorosilane ($CF_3(CF_2)_7(CH_2)_2Si(CH_3)_2Cl$; PFDDCS) on the protective layer 506 and mirror 518. When such a monolayer is further deposited on the surface of the protective layer 506, it is preferable to use a high resistance material similar to that of the protective layer 506 to minimize any impacts on the resistance value of the elastic hinge 511a.

In practice, there are the process for dividing a mirror device into mirror devices of a size to be used by carrying out a dicing process followed by the process for packaging the individually divided mirror devices. A description of them is not provided herein.

In a prefer embodiment, the mirror device has elastic hinges 511a that have a height of 2 μm or less and preferably have a height ranging between 0.3 to 1.2 μm. Furthermore, the mirror 518 is formed substantially to have a square shape with one side of the square having a length 10 μm or less.

Furthermore, the elastic hinge is connected onto an electrode at a location that is in the vicinity of the rear surface of a mirror so that the illumination light projecting onto the elastic hinge is minimized.

Figure 6A:
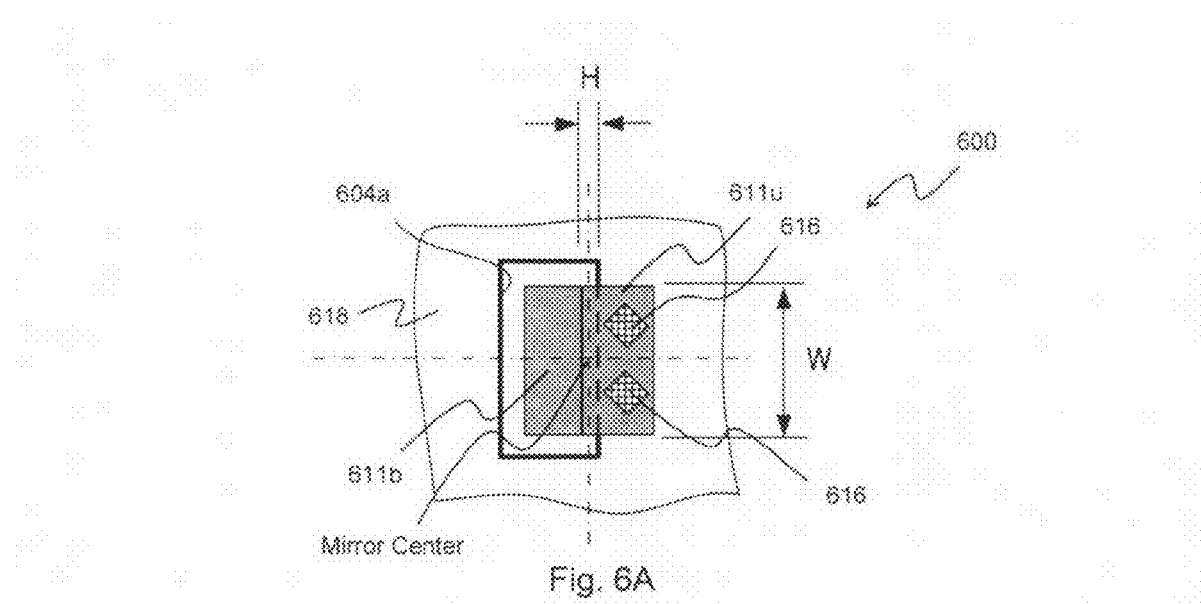
FIG. 6A is a top view for showing a mirror element.
Figure 6B:
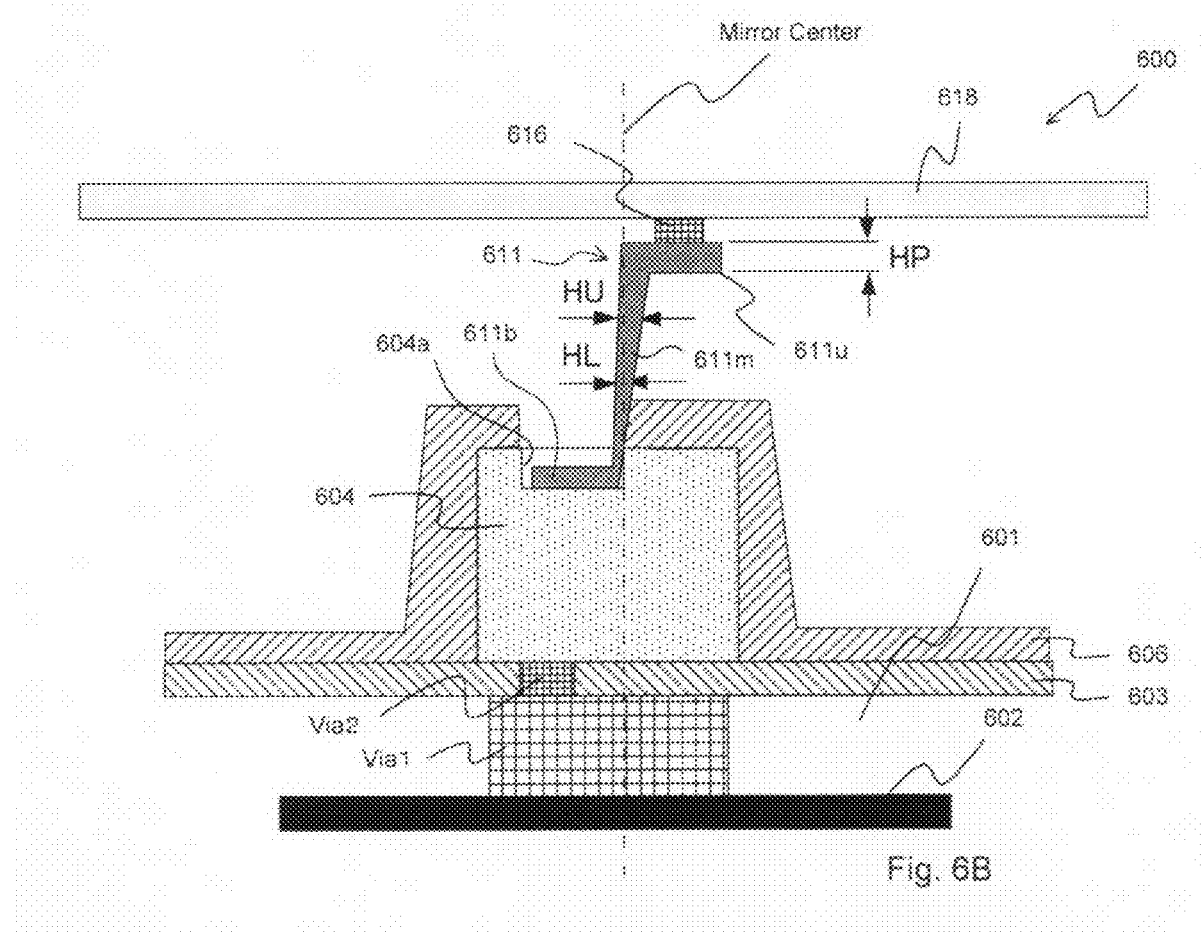
FIG. 6B is a side cross sectional view of a mirror element of FIG. 6A.

FIG. 6A is a top view hand FIG. 6B is a side cross sectional view of a mirror element 600.

The elastic hinge 611 of the mirror element 600 is fabricated by processing steps according substantially to the processing steps described above has an intermediate part 611m extending in the vertical direction (i.e., approximately perpendicular to a substrate 601). Further, the upper part 611u of the elastic hinge 611 is a flat part extending horizontally by bending from the intermediate part 611m. The bottom part 611b of the elastic hinge 611 is a flat part extending horizontally and bending from the intermediate part 611m in a direction opposite to the upper part 611u.

A mirror 618 is attached to the upper part 611u of the elastic hinge 611 through a joinder part 616. The elastic hinge 611 is formed at the center of the mirror 618 with the joinder part 616 disposed on top of the upper flat part 611u at an off-center position offset from the center of the mirror 618 in the deflection direction thereof. Note that the joinder part 616 may alternatively be placed at a off-center position with an offset distance along a direction opposite from the deflection direction of the mirror 618.

Further, the bottom part 611b of the elastic hinge 611 is attached to the bottom surface of the concave part 604a of an electrode 604. A bottom portion of the intermediate part 611m is attached to the side surface of the concave part 604a.

In FIG. 6A, the joinder part 616 has a rectangular shape and arranged in an orientation that all sides of the rectangular cross section of the joinder part 616 along a horizontal direction having an inclined angle relative to the deflection direction of the mirror 618. Specifically, each side of the joinder part 616 is arranged with an orientation that has an inclined angle of 45 degrees relative to the deflection direction of the mirror 618. In the case when the attachment of the joinder part 616 causes any defection on the reflection surface of the mirror 618, abnormal diffraction light and/scatter light may be projected from the mirror 618. Even in such case, the abnormal diffraction and/or scattering light would not project along a direction orthogonal to the deflection direction of the mirror thus minimize the influence of the abnormal diffraction and/or scattering light since amount of these abnormal diffraction and/or scattering lights projected along an ON light direction is minimized with such joinder part orientation. Further, it is desirable to minimize an occurrence defection on the top surface of the mirror by limiting the height of the joinder part 616 to be less than 0.1 μm and preferably no more than 0.05 μm. Furthermore, the horizontal cross section of the joinder part 616 may have a shape of a circle or oval and the joinder part 616 has no straight side-surface.

There are additional considerations in manufacturing the mirror element 600 when fabricating the elastic hinge 611 due to the fact that there is a significant change in the elastic strength with a variation in the thickness or fluctuation of the height of the elastic hinge 611. Furthermore, due to a residual stress resulting from some of the processing steps, the elastic hinge 611 may sometimes be deformed after the sacrifice layer in the surrounding of the elastic hinge 611 is removed.

Therefore, the fabrication processes of the elastic hinge must be able to satisfy the condition that the width W of an elastic hinge as that defined by the length in the depth direction of the cross-section diagram shown in FIG. 6B) must be greater than the height L of the elastic hinge, i.e., $W>L$. Especially, it is desirable to place the elastic hinge 611 substantially along a vertical direction between the center electrode 604 and mirror 611 and has a configuration to satisfy the relationship that: The width W of the elastic hinge $611 \geq$ the height L of the elastic hinge>the thicknesses HP, HU and HL of the elastic hinge.

The inventor of the present invention have carried out some of the above manufacturing processes and confirm that the mirror 618 formed on the elastic hinge 611 tends to incline instead of maintaining at a horizontal position when the width W of an elastic hinge is not greater than the height L of the elastic hinge. For example, the mirror 618 tends to incline instead of maintaining at a horizontal position when the elastic hinge is formed with a height of 1 μm and a width W of the elastic hinge as 0.8 μm.

In contrast, when an elastic hinge is fabricated to satisfy the condition that The width W of an elastic hinge is greater than the height L of the elastic hinge, e.g., The height L of an elastic hinge 611 is 1 μm and the width W of the elastic hinge 611 is 1.2 μm, then the mirror 618 is confirmed to maintain at a horizontal position.

In the case of forming a plurality of elastic hinges 611 to support one mirror 618, the plurality of hinges retain the mirror 618 and therefore the width W of each elastic hinge can be reduced. If the thickness of an elastic hinge is small, however, it is desirable to satisfy the condition of:

The width W of an elastic hinge>the height L of the elastic hinge

Further, a joinder layer may be deposited on the bottom surface of the mirror 618. By forming the joinder layer with a small area, the deformation and/or warping of the mirror 618 caused by the difference in the linear expansion coefficient between the mirror 618 and joinder layer may be prevented.

The intermediate part 611m of the elastic hinge 611 is tapered off from the upper part 611u toward the bottom part 611b, with the thickness gradually decreasing toward the bottom part 611b, i.e., the thicknesses HU>HL. Note that the thickness HP of the upper part 611u is the same as that of the uppermost part of the intermediate part 611m, while the thickness of the bottom part 611b is about the same as that of the middle part of the intermediate part 611m.

Further, the elastic hinge 611 is preferred to satisfy the relationship of the area size of a horizontal cross-section of the upper part 611$u$>the area size of a horizontal cross-section of the bottom part 611$b$.

The elastic hinge 611 manufactured with convenient processing steps as described above has a very high endurance as an elastic body. It is confirmed that the elastic hinge is able to sustain normal operation after several trillions of deflections.

Meanwhile, the height of the electrode 604 extended from the substrate 601 is approximately the same as the height of the elastic hinge 611 supported on and extended from the concave part 604$a$ of the electrode 604. Alternatively, the elastic hinge extended from the concave part 604$a$ may be formed with a height smaller than the height of the electrode 604 to prevent a potential problem that the mirror 618 is formed with an incline angle relative to the substrate 601 in the process of removing a plurality of sacrifice layers. Further, by forming the elastic hinge with smaller height thus reducing the distance between the mirror 618 and electrode 604 further improve the manufacturing process to more conveniently make the mirrors 618 with a uniform height.

Furthermore, a configuration of making the height of the elastic hinge 611 no more than the distance between the concave part 604$a$ and substrate 618 further reduces the likelihood that the mirror 618 is formed with an incline angle relative to the substrate 601.

FIG. 6B shows a second protective layer 606 is deposited on top of the first protective layer 603. The first protective layer 603 is formed as a silicon carbide (SiC) layer, while the second protective layer 606 is formed as an amorphous silicon layer. The elastic hinge 611 is also formed with an amorphous silicon material and doped with boron (B), phosphorous (P) or arsenic (As). Because of this, when a voltage is applied to the electrode, the voltage is applied to the mirror 618 through the elastic hinge 611. Alternatively, the mirror 618 can be connected to the ground (GND) by way of the elastic hinge 611. In this case, the elastic hinge 611 is preferred have a resistance of 1 GΩ or less, and for some applications, the resistance is further preferably 100 MΩ or less. The elastic hinge 611 has a high resistance of at least 1 TΩ if the elastic hinge is formed with amorphous silicon and the resistance of the amorphous silicon can be 1000 times higher if the amorphous silicon containing a very small amount of impurity. When elastic hinge 611 has a high resistance, the response characteristics are adversely affected during a mirror deflection operation due to the fact that the electrons would not flow through the elastic hinge 611 smoothly. It is therefore necessary to increase the voltage applied to the address electrode for driving the mirror 618. For this reason, when the mirror is controlled to turn On/Off at a high-speed, such as 300 nsec or less, or 100 nsec or less, or even 20 nsec or less, the resistance of the elastic hinge is preferred to be at least 1 GΩ or less, or further preferably 500 MΩ or less. Under the circumstances that the mirror is required to operate in a higher speed, the elastic hinge is preferred to have a resistance that is further reduced to ranges such as 200 MΩ or less, 100 MΩ or less, or even 50 MΩ or less.

In alternate embodiments, the second protective layer 606 is not formed as a layer with a doping and therefore remains to be a layer of high resistance. Specifically, the second protective layer 606 has a higher resistance than the elastic hinge 611. Furthermore, the gap between the mirrors 618 of the mirror device is preferably between 0.15- to 0.55 μm and the elastic hinges 611 is preferably formed with a height that is 2 μm or less, or further preferably between 0.3- and 1.2 μm supported on and extended from the electrodes of approximately the same heights. In an exemplary embodiment, the mirror 618 of each mirror element is formed as an approximate square shape with each side having a length ranging between 8- to 10 μm. With such a mirror configuration, the elastic hinge 611 is hidden in the rear surface of the mirror 618 thus preventing the illumination light to project directly onto the elastic hinge 611. Even in the case that the elastic hinge 611 is formed by using a semiconductor material and having a relatively high resistance, the adverse effects such as the movement of photoelectrons in the elastic hinge 611 produced by illumination light projected onto the elastic hinge 611 can be reduced.

Figure 7A:
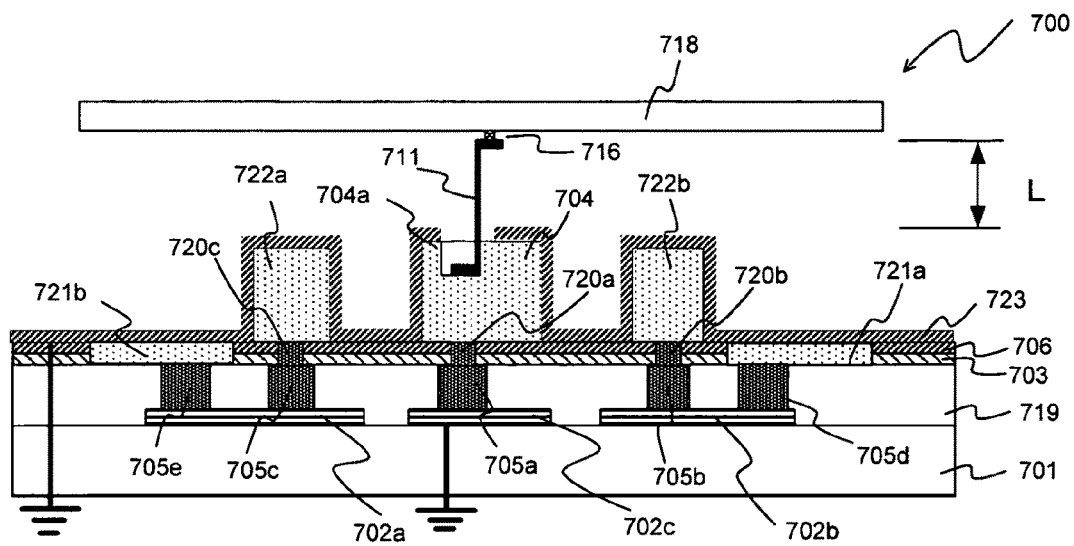
FIG. 7A is a cross-sectional view of a mirror element.

FIGS. 7A through 7F are diagrams for describing a mirror element 700. Similar to the mirror element 600 shown in FIGS. 6A and 6B, FIG. 7A shows a mirror element 700 manufactured by the processing steps described above. The substrate 701 supports the mirror element 700 that includes the wirings 702$a$, 702$b$ and 702$c$ of a drive circuit for driving and controlling a mirror 718; first set of via connectors 705$a$, 705$b$, 705$c$, 705$d$ and 705$e$, which are connected to the wirings 702$a$, 702$b$ and 702$c$; and a first insulation layer 719. Note that in a preferred embodiment, the drive circuit includes a dynamic random access memory (DRAM). As shown on the left side of FIG. 7A, The wiring 702$a$ further includes two of the first set of via connectors 705$c$ and 705$e$, both penetrate through the first insulation layer 719. The wiring 702$b$ on the right side of FIG. 7A also includes two of the first set of via connectors 705$b$ and 705$d$, both penetrate through the first insulation layer 719. Meanwhile, the wiring 702$c$ at the center includes one of the first sets of via connectors 705$a$.

As described above, five of the first sets of via connectors penetrate through the first insulation layer 719. Note that the number of first set of via connectors may be different between the left and right wirings. Further, the number of first set of via connectors may be more, or less, than the five via connectors as shown. Then, second set of via connectors 720$a$, 720$b$ and 720$c$ or surface electrodes 721$a$ and 721$b$ are formed on top of the first set of via connectors 705$a$, 705$b$, 705$c$, 705$d$ and 705$e$. Specifically, the second Vias 720$a$, 720$b$ and 720$c$ are respectively formed on top of the first set of via connectors 705$a$ formed on the wiring 702$s$ at the center, the first via connectors 705$b$ and 705$c$ on one side of two first set of via connectors formed on the wirings 702$b$ and 702$a$ on the left and right sides. Meanwhile, surface electrodes 721$a$ and 721$b$ are respectively formed on top of the remaining first set of via connectors 705$d$ and 705$e$ not supporting any of the second set of via connectors 720$a$, 720$b$ and 720$c$ thereon. The semiconductor wafer substrate 701 is preferably a silicon substrate supporting an insulation layer 719 thereon. A First protective layer 703 is deposited on top of the first insulation layer 719 and a second protective layer 706 is formed on the first protective layer 703. The wirings 702$a$, 702$b$ and 702$c$ of the drive circuit are preferably formed by using the aluminum wirings. The first set of via connectors 705$a$, 705$b$, 705$c$, 705$d$ and 705$e$ and the second set of via connectors 720$a$, 720$b$ and 720$c$ are preferably formed by using a material including tungsten and copper.

The surface electrodes 721$a$ and 721$b$ may be formed with the same material or a similar material such as a tungsten with the materials used in forming the first set of via connectors 705$a$, 705$b$, 705$c$, 705$d$ and 705$e$ and the second set of via connectors 720$a$, 720$b$ and 720$c$. Alternate materials with a high electrical conductivity such as an aluminum material may also be used. Depending on specific device configurations, the surface electrodes 721$a$ and 721$b$ may have flexible sizes and shapes that can be discretionarily determined. In addition to the configuration shown in FIG. 7A where the surface electrodes 721*a* and 721*b* are formed respectively on top of the first set of via connectors 705*d* and 705*e* these electrodes may also be formed directly on the wirings 702*a* and 703*b*, respectively.

The first insulation layer 719, the first and second protective layers 703 and 706 may be preferably formed as layers composed of silicon compounds such as silicon carbide (SiC), amorphous silicon and silicon dioxide (SiO2).

By forming the surface electrodes 721*a* and 721*b* as aluminum electrodes, a direct contact between the amorphous silicon and the aluminum electrodes must be prevented due to the concern of aluminum corrosion of the surface electrodes 721*a* and 721*b*. Therefore, a silicon carbide (SiC) layer disposed between the amorphous silicon and the aluminum surface electrodes 721*a* and 721*b* is probably necessary. Alternate embodiments may be configured by forming the electrodes by using materials with mixing impurity such as silicon (Si) with aluminum, or by forming of a barrier layer made of tantalum (Ta) or titanium (Ti) on the top or bottom of the electrode. This barrier layer may also be formed to comprise two or more layers.

Special consideration should also be taken into account that a stiction generated by the contact between the mirror 718 and electrodes 722*a* or 722*b* on the left or right side should be prevented. This is achieved by providing a stopper on the substrate 701 so that the mirror 718 is stopped before contacting with either electrodes 722*a* or 722*b* on the left and right sides. The electrodes 704, 722*a* and 722*b* are preferably formed with a high electrically conductive material such as aluminum and electrically connected to the second set of via connectors 720*a*, 720*b* and 720*c*, respectively.

Figure 9A:
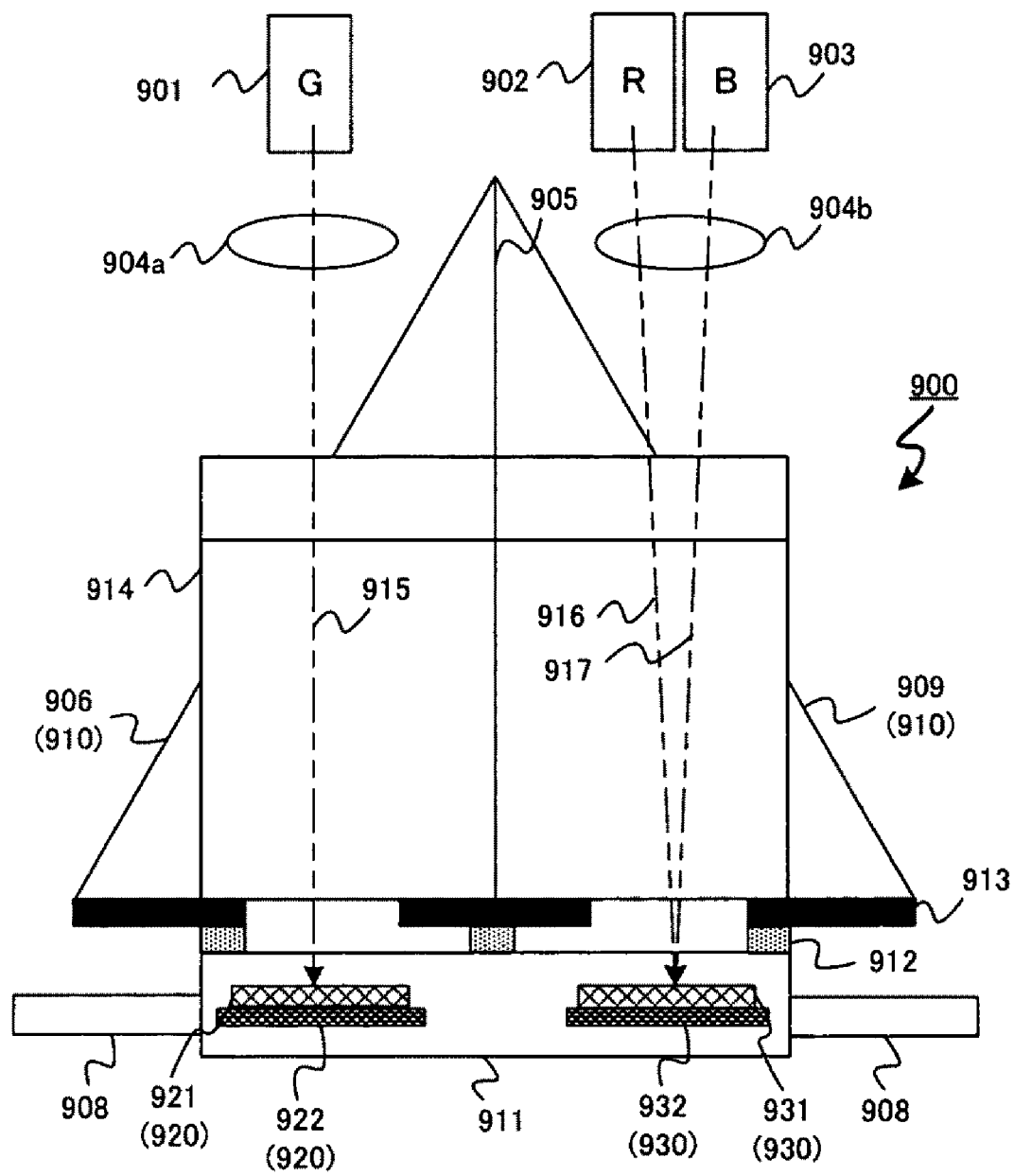
FIG. 9A is a front view diagram for showing a two-plate projection apparatus comprising two mirror devices.

The center electrode, i.e., the hinge electrode, 704 is the electrode placed for an elastic hinge and is configured to have the same height as the left and right electrodes 722*a* and 722*b*. These three electrodes 704, 722*a* and 722*b* have the same height can therefore be manufactured simultaneously by applying the same fabrication processes. A process to adjust the height of the center electrode 704 during the production processes further enhance the process of determining the location of the center part for placing the elastic hinge 711 as will be further described below The elastic hinge 711 is formed with amorphous silicon in an exemplary embodiment. The thickness (i.e., the left to right direction of FIG. 9A) of the elastic hinge 711 is preferably in a range between about 150- and 400 angstroms.

In alternate embodiments, a plurality of elastic hinges may be formed to support and deflect one mirror 718 and the hinges may have a smaller width. For example, two elastic hinges each having a smaller width than a single elastic hinge for supporting and deflecting a mirror 718 may be installed on both ends of the mirror.

Furthermore, if the elastic hinge 711 is formed with a silicon (Si) material, it is preferable to form the elastic hinge 711 as an electrically conductive hinge by applying an In-Situ doping with boron (B), arsenic (As), or phosphorous (P), by using an ion implanted material, or by diffusing a metallic silicide such as nickel silicide (NiSi) and titanium silicide (TiSi). When the elastic hinge 711 is formed with silicon (Si) as a group IV element among semiconductor materials, an additive to the hinge may be appropriately selected from among the materials belonging to the III group or V group.

Furthermore, the mirror element 700 further includes a second insulation layer as a protective film 723 is deposited on the surface of the structure part of the substrate 701 and the second insulation layer 723 and the center electrode 704 are connected to GND. The second insulation layer 723 is preferably formed as a layer containing silicon (Si) such as silicon carbide (SiC) and amorphous silicon. This layer is formed for preventing corrosion caused by hydrogen fluoride (HF) coming into contact with the electrodes 704, 722*a* and 722*b* and surface electrodes 721*a* and 721*b* when these electrodes are formed as aluminum electrodes.

Furthermore, a joinder layer is formed on the top surface of the elastic hinge 711. The joinder layer may be formed by using the same material as the elastic hinge by configuring the joinder layer to have the same area size and form as the mirror 718. In order to prevent the mirror 718 from deforming and/or warping due to the difference in linear expansion coefficient between the mirror 718 and joinder layer, it is preferable to form the joinder layer with a smallest possible area size.

Further, a joinder to function as a mirror connection part 716 is deposited on the joinder layer of the elastic hinge 711 for enhancing an electric conduction between the elastic hinge 711 and mirror 718 and flexibly adjusting the layer thickness for eliminating a variation in the height among the individual mirror elements.

In an exemplary embodiment, the joinder layer 716 is preferably formed with a single crystal silicon (Si), amorphous silicon or poly-silicon. The joinder layer 716 is then applied with an In-Situ doping with boron, arsenic or phosphorous, or ion-implanted; or an annealed semiconductor material. Alternatively, the joinder layer 716 may be further processed by diffusing a metallic silicide such as nickel silicide (NiSi) and titanium silicide (TiSi) to increase the electrical conductivity. With the joinder layer 716 formed with a group IV semiconductor material containing silicon (Si), an additive into the joinder layer may be appropriately selected from among the materials in group III or group V. The resistance of the joinder layer 716 is approximately the same as that of the elastic hinge 711 or mirror 718, and is lower than the resistance of the first and second protective layers 703 and 706.

With the mirror 718 formed with aluminum and the elastic hinge 711 formed with a silicon material, a barrier layer (not specifically shown) may be deposited on the top and bottom surfaces of the joinder layer 716 to prevent the mirror 718 to contact the elastic hinge 711 and the barrier layer may be also be formed with two or more layers. Then, a mirror 718 is formed on top of the joinder layer 716 of the elastic hinge 711 to complete the processes for fabricating the mirror element 700.

The mirror 718 is preferably formed as a member that has a high reflectance of light such as an aluminum surface. The mirror surface may also be formed by using an aluminum alloy containing titanium (Ti) and/or silicon (Si). Meanwhile, the top surface of the mirror 718 may be provided with an aluminum oxide layer.

In an exemplary embodiment, the mirror 718 is preferably formed with a square or a diamond shape, with each side having a length in a range about 4- to 11 μm. The gap between individual mirrors 718 is preferably about 0.15- to 0.55 μm. In a preferred design, the opening ratio of an individual mirror element, i.e., the ratio of the area size occupied by the mirror 718 to function as the reflection area to the area that includes the mirror 718 arranged in an array and the gap between mirrors 718, is no less than 85%, or further preferably, no less than 90%. With such configuration, even in the case that the elastic hinge 711 is formed with a semiconductor material and having a relatively high resistance value, the adverse effects caused by the movement of photoelectrons generated in the elastic hinge 711 when irradiated by the illumination light can be reduced. In a preferred embodiment, the configuration is to provide the reflection areas occupy about 85% of the areas of the total areas of the mirrors 718 even when a torsion hinge is used.

Figure 7B:
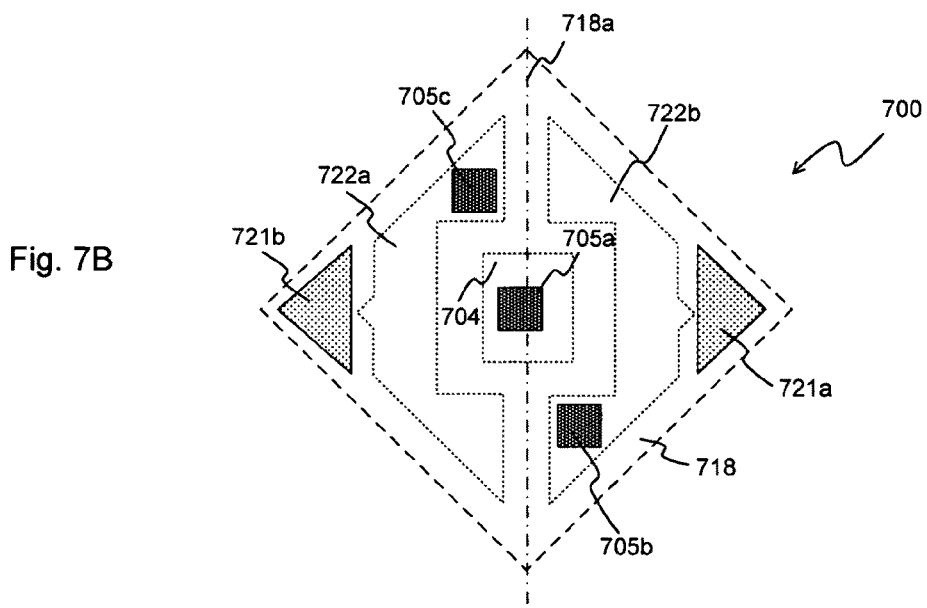
FIG. 7B is a top view diagram showing the surface of the semiconductor wafer substrate of a mirror element.

FIG. 7B is a top view to show the surface of the substrate 701 supporting the mirror 718 shown by the dotted lines and controlled by the left and right electrodes 722a and 722b and the center electrode 704. Meanwhile, the deflection axis 718a of the mirror 718 is indicated by a single-dot chain line.

As shown in FIG. 7B, the surface electrodes 721a and 721b have a rectangle shape and are placed in opposite corners of the mirror 718. Further, the surface electrodes 721a and 721b are symmetrically placed on opposite sides of the center of the mirror 718. Note that the surface electrode 721 may be provided by arraying a plurality of miniature electrodes as indicated by the component signs 721c and 721d shown in FIG. 7C. The individual miniature electrodes are respectively connected to Vias 705 to maintain at a same potential. The individual miniature electrodes can be formed by a single production process as that for forming a via connector between the metallic layers in the semiconductor production process that can be conveniently carried out as standard processing steps.

Figure 7C:
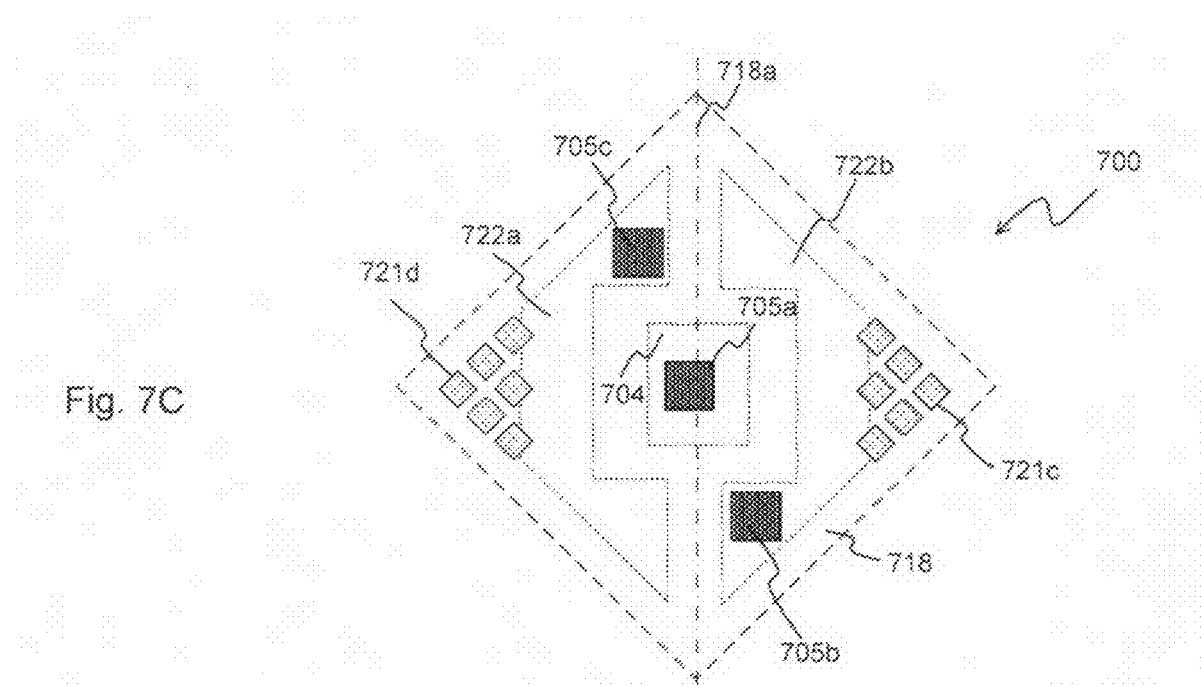
FIG. 7C is a top plain view for showing a modified exemplary embodiment by changing the surface electrode of FIG. 7B to a plurality of surface electrodes.

The electrodes 722a and 722b formed on the left and right sides of the elastic hinge 711 are placed at the areas not occupied by the surface electrodes 721a and 721b and hinge electrode 704 under the mirror 718. Alternatively, the electrodes 722a and 722b may also be formed to overlap the entirety, or a part, of the surface electrodes 721d and 721e as shown in FIG. 7C. By simultaneously applying a same voltage to the surface electrodes 721 and electrodes 722, the surface electrodes 721 and electrodes 722 may be electrically conductive to each other. In contrast, when the voltages applied to the surface electrodes 721 and electrodes 722 are in different timings or with different voltages, then electrically separated and different drive circuits are connected to the respective electrodes 721 and electrodes 722. The electrodes 722a and 722b are also symmetrically formed relative to the center of the mirror 718 just like the surface electrodes 721a and 721b.

Figure 7D:
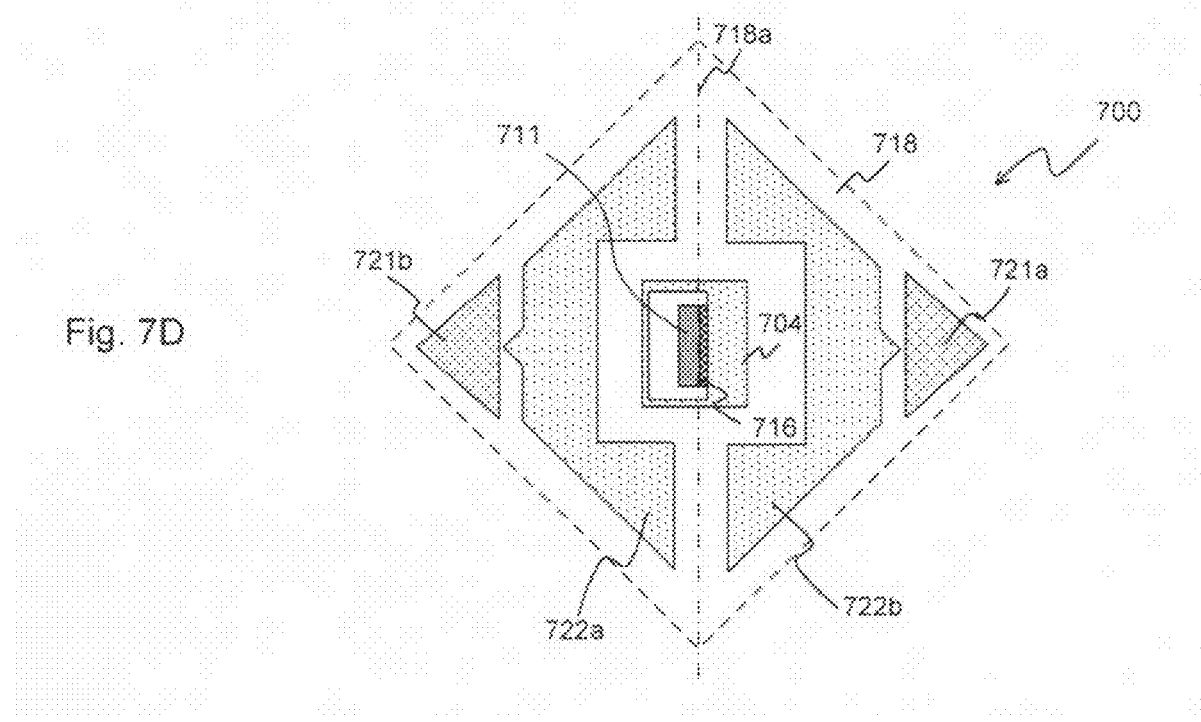
FIG. 7D is a top view for showing a mirror element excluding a mirror.

FIG. 7D is a top view of the mirror element 700 excluding the mirror 718 with the mirror 718 is represented by an enclosure box shown in dotted lines.

As shown in FIGS. 7A and 7D, the electrodes 722a and 722b are formed to extend from the substrate 701. Then, the electrodes 722a and 722b are formed to allow the mirror 718 to have contact with the electrodes 722a and 722b, respectively. The electrodes 722a and 722b define the maximum deflection angles of the mirror 718.

In a preferred embodiment, the electrodes 722a and 722b are formed to define the deflection angle of the mirror 718 between 12- and 14 degrees. Such a deflection angle of the mirror 718 is preferably designed in compliance with the designs of the light source and optical system of a projection apparatus. A preferable design also includes the height of the elastic hinge 711 of each mirror element 700 less than or equal to 2 μm and the mirror 718 of each mirror element 700 to have a square shape with the length of each side less than or substantially equal to 10 μm.

Figure 7E:
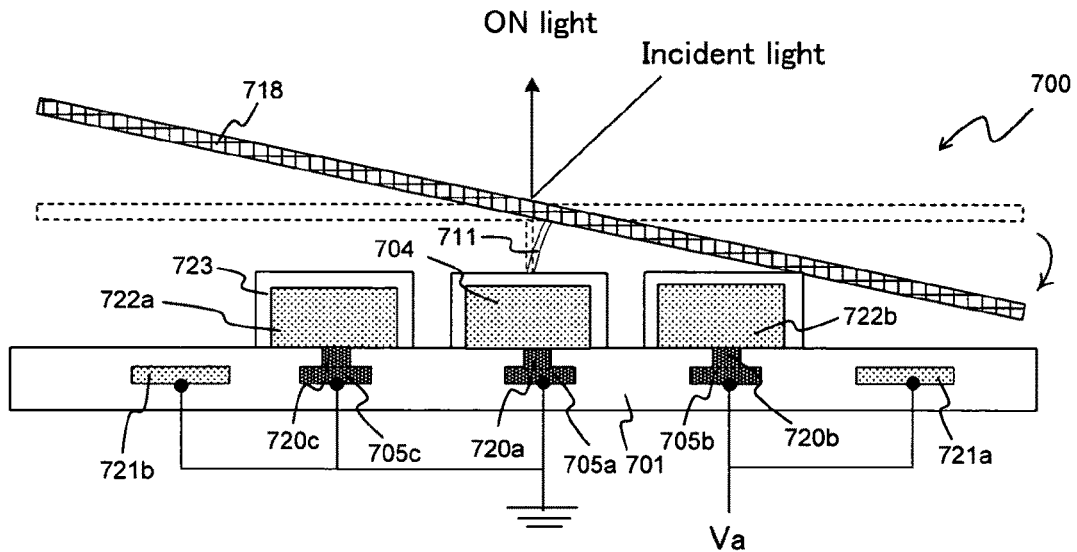
FIG. 7E is a cross-sectional view for illustrating the ON state of a mirror element.

FIG. 7E shows the mirror 718 of the mirror element 700 is controlled to operate in an ON state when the mirror 718 reflects the incident light emitted from a light source along an ON light direction when the mirror 718 deflects to the right side. In contrast, FIG. 7E shows the mirror 718 of the mirror element 700 is controlled to operate in an OFF state when the mirror 718 reflects the incident light emitted from a light source along an OFF light direction when the mirror 718 deflects to the left side.

When no voltage is applied to surface electrodes 721a and 721b on the left and right sides of the mirror element 700 and electrodes 722a and 722b, the elastic hinge 711 is not deformed, and the mirror 718 is kept at a horizontal direction. As a voltage is applied to the electrode 722b and surface electrode 721a, both on the right side, a coulomb force is generate and the Coulomb force can be represented as (the upper surface area of an electrode)×(the applied voltage to an electrode)/(the second power of the distance between the electrode and mirror)

The Coulomb force is generated between the mirror 718 and the electrode 722b on the right side and the surface electrode 721a on the right side. The mirror 718 is drawn by the total Coulomb forces between the mirror 718 and electrode 722b and deflected to the right. The distance between the mirror 718 and the right-side surface electrode 721a is larger than the distance between the mirror 718 and the right-side electrode 722b. Also the surface area of the surface electrode 722b is larger than the right-side electrode 721a. Therefore, the Coulomb force generated between the mirror 718 and the right-side surface electrode 722b is greater than that generated between the mirror 718 and the right-side electrode 721a.

Further, when the mirror 718 is deflected to approach the right-side surface electrode 721a, the reaction force is now strong due to the restoring force of the elastic hinge 711 as a result of the mirror 718 is deflected to a maximum angle between 12- to 14 degrees. The right-side surface electrode 721a placed on the surface of the substrate, however, is drawing the mirror 718 with a smaller coulomb force governing by a lever principle, i.e., the principle of moments of a rigid body. The Coulomb force draws the right end part with a long distance from the elastic hinge 711 of the mirror 718. As a result, by applying a low voltage to the right-side surface electrode 721a can maintain the deflection state of the mirror 718.

When the mirror 718 is deflected to the right side as described above, the reverse-side (i.e., the left side) surface electrode 721a and the left-side electrode 722a are maintained at a ground potential. In a deformed condition, the bottom part of the elastic hinge 711 on the side near the electrode 704 has the largest elastic stress.

Figure 7F:
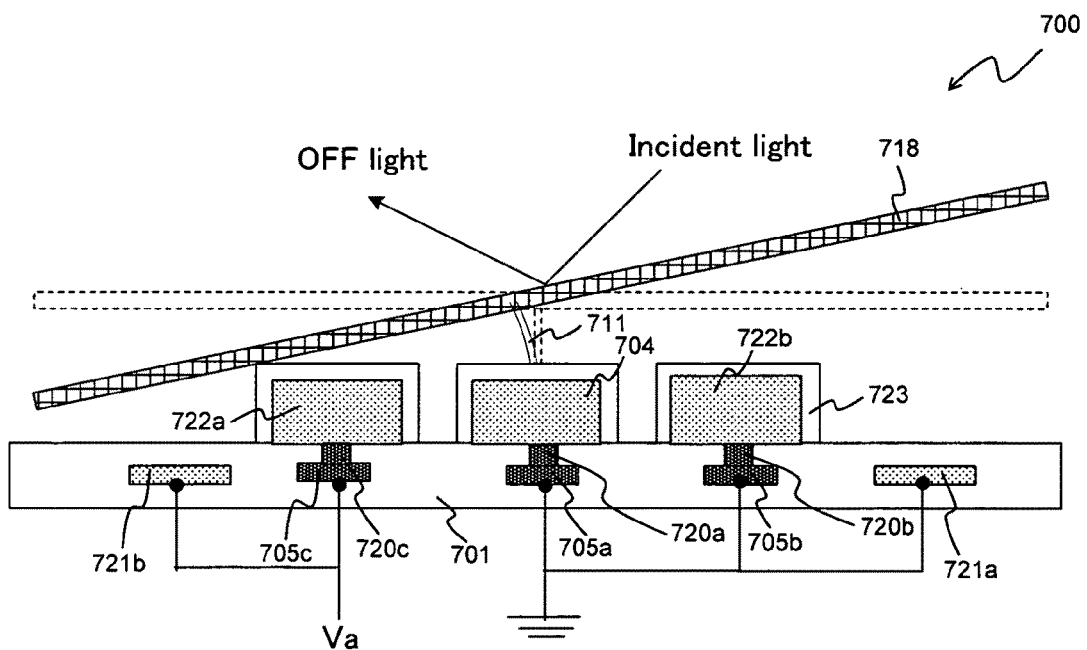
FIG. 7F is a cross-sectional view for illustrating the OFF state of a mirror element.

FIG. 7F shows the mirror 718 deflected to the left side as the mirror element 700 is controlled to operate in an OFF light state. A voltage is applied to the electrode 722a and surface electrode 721b on the left side that is opposite to the electrodes for operating the mirror in an ON state.

In different embodiments, the voltages applies to the electrodes may be flexibly changed for different shapes and size of the mirror 718 and elastic hinge 711, or for different deflection force and control of the elastic hinge 711, or for different deflection control due to changes made to the mirror 718 or changes made to the configurations between the left and right sides of the mirror element 700. Different voltages may be applied by changing the area size, height and/or placement (i.e., the layout) of the respective surface electrodes 721a and 721b or respective electrodes, 722a, 722b and 704 between the right and left sides of the mirror element 700, in order to control the deflection of the mirror 718. Moreover, multi-step voltages may be applied to the respective surface electrodes 721a and 721b and respective electrodes 722a and 722b on the right and left sides of the mirror element 700 to perform a control.

Furthermore, the circuits and voltages for driving the surface electrodes or electrodes for either one of the right-side surface electrode 721a and electrode 722b and the left-side surface electrode 721b and electrode 722a of the mirror element 700 may be flexibly changed depending on specific device requirements for different image display systems.

Furthermore, at least one or both of the right side and left-side surface electrodes 721a and 721b respectively of the mirror element 700 may be protruded from the top surface of the substrate.

Note that the characteristic parts of the mirror element of the mirror device produced by the production method described by referring to FIGS. 5A through 5F, the mirror element 600 shown in FIGS. 6A and 6B, and the mirror element 700 shown in FIGS. 7A through 7F may be flexibly combined and applied to manufacture different types of mirror elements for different types of image display systems as will be further described below.

<Single-Plate Projection Apparatus>

Figure 8:
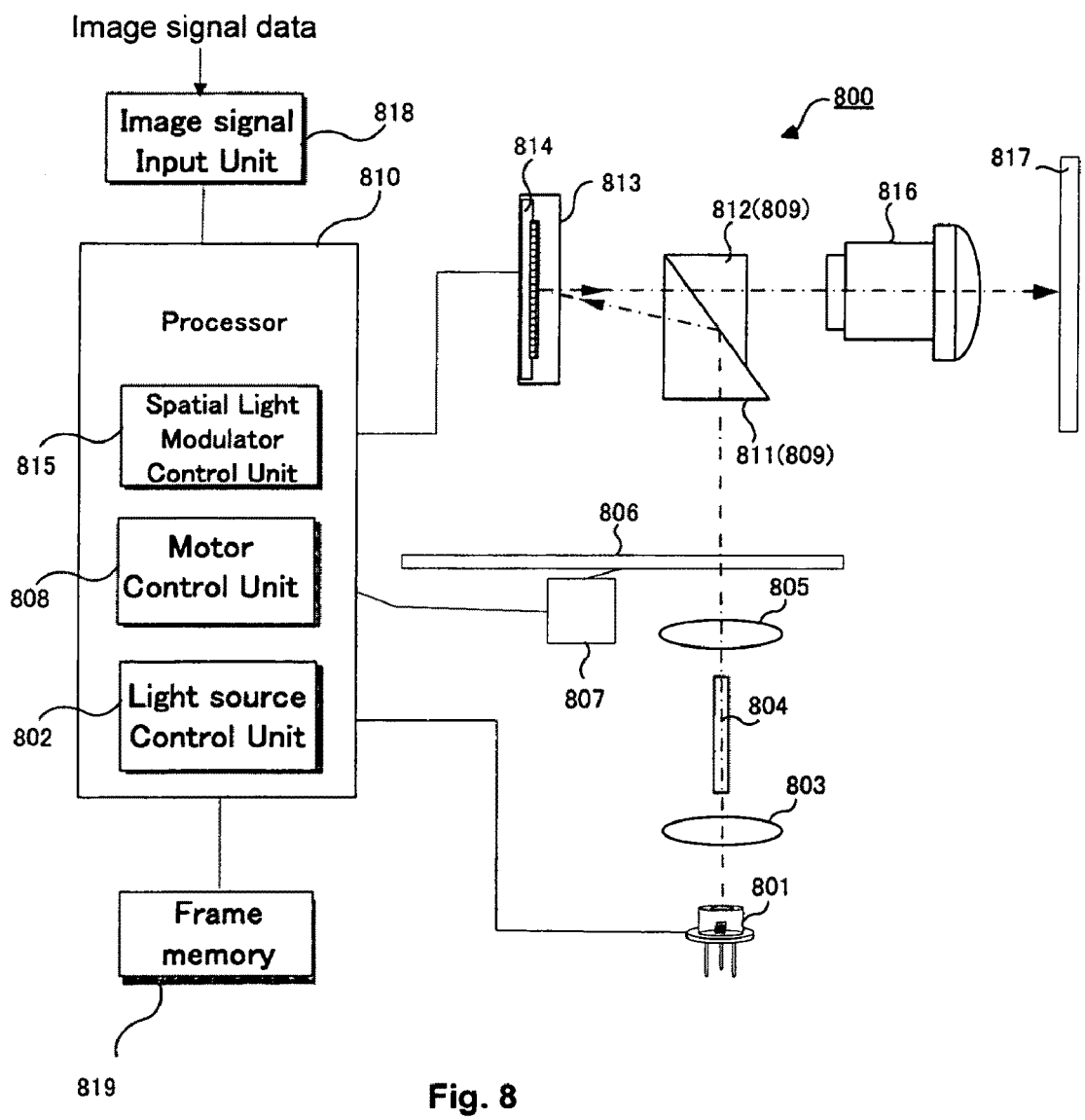
FIG. 8 is a functional block diagram for showing a single-plate projection apparatus comprising one mirror device.

The following is a description of an example of the single-plate projection apparatus comprising one mirror device as an exemplary embodiment in the present embodiment. FIG. 8 is a functional block diagram of a single-plate projection apparatus implemented with a mirror device as described above in the present invention. The projection apparatus includes a light source 801 emits the light for projecting an image. The projection apparatus further includes a processor 810 that includes a light control unit 802 to control the light source 801. The light source 801 may be an arc lamp light source, a laser light source or a light emitting diode (LED). The light source 801 may also be implemented with a plurality of sub-light sources. The number and period of time, of sub-light sources to for projecting lights are controlled by the light source control unit 802 to adjust the light intensity.

Also, the light source control unit 802 controls each the sub-light sources according to the locations of the sub-light sources for emitting a light with a predefined light intensity distribution.

The light source 801 may also be implemented with a plurality of laser light sources with different wavelengths. The light source control unit 802 may flexibly control each of the individual laser light sources to select a color of the incident light thus eliminating the requirement of a color light wheel 806 described below. The light source may be implemented with a laser light with a pulse emission of light or a light emitting diode (LED) light source.

By using a near-parallel flux of light with a small light dispersion angle, such as a laser light source, based on the operational principles of the etendue, the numerical aperture NA of an illumination light flux of the flux reflecting on the mirror device 814 can be reduced. This configuration has the advantage that an interference of the illumination light flux prior to projecting to the mirror device with the reflected lights projected from the mirror device is minimized. An image display system can be provided with reduced size by configuring the optical paths of these fluxes closer to each other. The quality of the image can also be improved by projecting the image light using a more compact system with a mirror device having a smaller deflection angle. The image display system further includes a first condenser lens 803 converges the light from the light source 801, a rod integrator 804 uniforms an intensity of light; and a second condenser lens 805 converges the light emitted from the rod integrator 804.

The image display system further includes a color wheel 806 that includes a filter member implemented with a plurality of filters. Each of the individual filters extracts a specific wavelength. As an example, the filter member includes three filters, i.e., a filter for extracting the light of the wavelength of red, that for extracting the light of the wavelength of green and that for extracting the light of the wavelength of blue. Further, each filter of a light-passing path is controlled by a color wheel drive unit 807 to flexibly change colors of each light-passing path by rotating or sliding the filter member. The filter may also have a specific polarization property. The motor control unit 808 of a processor 810 controls the color wheel drive unit 807. The rotation or slide speed of the filter is controlled by the color wheel drive unit 807.

A total internal reflection (TIR) prism 809 includes an air gap between two triangle prisms, i.e., a first prism 811 and a second prism 812. Further, the first prism 811 carries out a function to totally reflect the incident light. As an example, the first prism 811 totally reflects the incident light to the light path entering the mirror device. The totally reflected light is modulated by the mirror device and reflected toward the second prism 812. The second prism 812 transmits the reflection light incident thereto at a angle that is smaller or equal to a critical angle or smaller and then modulated by the mirror device 814 housed in the package 813 and controlled by a spatial light modulator control unit of the processor 810.

A projection lens 816 serves a function of enlarging the light reflected and modulated by the mirror device 814 to project the light onto a screen 817. The processor 810 includes a light source control unit 802, a motor control unit 808 and an SLM control unit 815. The processor 810 carries out the function of synchronously controlling, coordinating, integrating, and processing the signals received from and transmitting to each of the aforementioned control units Furthermore, the processor 810 is connected to an image signal input unit 818 to receive and processes image signal data input from the input unit 818. The processor 810 is further connected to the frame memory 819 and is capable of sending the processed image signal data.

The image signal input unit 818 inputs the incoming image signal data to the processor 810. Furthermore, the frame memory 819 receives and stores the image signal data of a single screen processed by the processor 810.

The following descriptions explain the principle of projecting a color image at the single-plate projection apparatus 800 shown in FIG. 8. In the single-plate projection apparatus 800, the light output from the light source 801 enters into a filter of the color wheel 806 through the first condenser lens 803, rod integrator 804 and second condenser lens 805.

The filter of the color wheel 806 extracts light of a specific wavelength enters into the first prism 811 of the total internal reflection (TIR) prism 809. Furthermore, the light reflected by the first prism 811 of the TIR prism 809 enters into the mirror device 814 housed in the package 813.

The light reflected from and also modulated by the mirror element of the mirror device 814 re-enters the TIR prism 809 and transmits through the second prism 812 of the TIR prism 809. Then, the transmitted light is projected onto the screen 817 through the projection lens 816.

In the optical transmission system as described, the light source control unit 802 of the processor 810 controls the intensity of light of the light source according to the image signal data received from the image signal input unit 818. Further, the motor control unit 808 is controlled according to the image signal data. The color wheel drive unit 807 is controlled by the motor control unit 808. Further, the color wheel drive unit 807 controls the change over of the filters of the color wheel 806. Furthermore, the SLM control unit 815 controls a plurality of light modulation elements of the mirror device 814 according to the image signal data.

The single-plate projection apparatus 800 configured as described above divides a period for displaying one image (i.e., one frame) into sub-frames corresponding to the individual wavelengths of light. The length of each sub-frame for display an image pixel is defined in relation to the respective wavelengths of light, e.g., the sub-frame for displaying an image pixel having a wavelength corresponding to red, green and blue. Further, the light of each wavelength is illuminated onto the mirror device 814 in accordance with a period of each sub-frame. Under the circumstance, the period of each sub-frame, the period of modulating the light of each wavelength at the mirror device 814 and the period of changing over a filter of the color wheel 806 are mutually synchronized and dependent. A selective reflection of the incident light at the mirror device 814 enables only the light of the individual wavelength reflected onto the projection light to be projected onto the screen. Further, sequential projections of lights of the individual wavelengths in accordance with the respective sub-frame periods enables a projection of a color image.

The following descriptions are provided to explain an exemplary embodiment of a multi-plate projection apparatus which comprises a plurality of mirror devices implemented with mirror elements as described in the above preferred embodiments. The multi-plate projection apparatus comprises a plurality of light sources, a plurality of mirror devices and a projection lens.

The light source may preferably be a laser light source or a light emitting diode (LED). A plurality of independently controllable laser light sources may be implemented. The independent control of each light source eliminates a need to apply a color filter by turning on and off a laser light source having a prescribed wavelength. The use of a laser light source enables a pulse emission for light intensity control, which has been difficult to achieve with a mercury lamp.

The following descriptions explain the configurations and principles of a two-plate projection apparatus and three-plate projection apparatus, as examples of multi-plate projection apparatus comprising mirror devices according to the embodiments described in this invention.

<Two-Plate Projection Apparatus>

The two-plate projection apparatus is configured to include two mirror devices to respond to two groups of light sources, respectively. Specifically, one mirror device modulates the light form one group of light source and another mirror device modulates the light from another group of light source. Then, each of the mirror devices synthesizes the reflected and modulated light for projecting a combined image.

As an example, when projecting an image with the lights of wavelengths corresponding to three colors, i.e., red light, green light and blue light, the high visibility green light is modulated by one mirror device, and red and blue lights are modulated by another mirror device in sequence or simultaneously, and then the light modulated by the these two mirror devices are synthesized to project a combined image onto a screen.

FIGS. 9A through 9D are functional block diagrams of a two-plate projection apparatus implemented with two mirror devices housed in one package.

The projection apparatus 900 shown in FIGS. 9A through 9D comprises a green laser light source 901, a red laser light source 902, a blue laser light source 903, illumination optical systems 904*a* and 904*b*, two triangle prisms 906 and 909, two mirror devices 920 and 930. These optical devices are housed in one package 911. The projection apparatus further includes a circuit board 908, a joint member 912, a light shield member 913, a light guide prism 914 and a projection optical system 923.

The individual light sources 901, 902 and 903 are laser light sources as described for the single-plate system and capable of performing a pulse emission. The light sources may alternatively be implemented by a plurality of sub-laser light sources. The light source may use two mercury lamps corresponding to the respective mirror devices. In the case of using the mercury lamps, a filter 905 that allows a passage of only the light of a specific wavelength while reflecting other light of wavelengths on the surface of synthesizing the reflection light in a prism 910 described later provides a similar effect as a color filter. Alternately, a light of specific wavelength may be separated by using a dichroic prism or dichroic mirror, and thereby the mirror device may be emitted with the light of the separated wavelengths.

The illumination optical systems 904*a* and 904*b* are optical elements such as collector lenses and rod integrators, which have been described above for the single-plate projection apparatus, convex lenses or concave lenses.

The prism 910 that includes and combines two triangle prisms 906 and 909 performs the functions of synthesizing the reflection lights from the two mirror devices 920 and 930. When the prism 910 synthesizes the reflection lights from the individual mirror devices, a filter 905, such as a dichroic filter, may be implemented to allow a passage of only the light of a specific wavelength while reflecting the other light of wavelengths on the surface of synthesizing the reflection light in a prism 910.

The filter 905 performs the same functions as a color filter because of the color filtering function of allowing a passage of only the light of a specific wavelength while reflecting the other light of wavelengths. Meanwhile, by using a laser light source for emitting the light having a specific polarization, a polarization light beam splitter film, or a polarization light beam splitter coating may be applied to perform a separation of light/a synthesis of light based on the difference in polarization direction of light, may be used for synthesizing a reflection light from the prism 910.

The package 911 is similar to the package described for the single-plate projection apparatus. The package 911 shown in FIGS. 9A through 9D is configured to contain two mirror devices 920 and 930 within one package 911. Alternatively, the mirror devices 920 and 930 may also be housed in separate packages.

FIGS. 9A through 9D show the mirror arrays 921 and 931, and device substrates 922 and 932, of the respective mirror devices 920 and 930.

The circuit board 908 is connected to a processor similar to the processor described for the single-plate projection apparatus described above. The processor comprises a SLM control unit and a light source control unit. Further, the processor processes the input image signal data and transmits the processed data to the SLM control unit and light source control unit. The SLM control unit and light source control unit control the mirror device and light source respectively by through the circuits on the circuit board 908 applying the processed data transmitted from the processor.

The mirror device is controlled and synchronized with the light source. The input of the image signal data to the processor and other functions carried out by the image display system have been described for the single-plate projection apparatus and therefore the description is not provided here.

The joint member 912 provides the function of joining the prism 910 to the package 911. A material used for the joint member 912 includes a fritted glass in an exemplary embodiment of this invention.

The light shield member 913 performs the function of shielding the unnecessary light. In an exemplary embodiment, the light shield member 913 may be formed with graphite or a similar kind of material. The projection apparatus 900 shown in FIGS. 9A through 9D includes the light shield member 913 formed on a part of the bottom of the prism 910 and also on the rear surface of the prism 910.

The light guide prism 914 is a right-angle triangle cone prism that includes a slope face adhesively attached to the front face of the prism 910 and the bottom of the light guide prism 914 facing upward. The light guide prism 914 is configured to have the optical axis of the individual light sources 901, 902 and 903, and the optical axis of the illumination optical systems 904a and 904b corresponding to the respective light sources and the optical axis of the light emitted from the individual light sources 901, 902 and 903 are respectively perpendicular to the bottom of the light guide prism 914. This configuration provides an orientation for aligning the optical system that the lights emitted from the individual light sources 901, 902 and 903 are projected along orthogonal directions to the light guide prism 914 and prism 910. As a result, the lights emitted from the individual light sources 901, 902 and 903 to project onto the light guide prism 914 and prism 910 have increased light transmission on the incidence surfaces of the light guide prism 914 and prism 910.

The projection optical system 923 is an optical element for projecting an image onto the screen in an exemplary embodiment, the projection optical system may include a projection lens for enlarging the images for projecting an image onto the screen or an image display surface.

By using a light source emitting polarized light and a polarization beam splitter film, a two-plate projection apparatus can be configured by disposing a ½ wavelength plate or ¼ wavelength plate on the bottom surface of the prism 910.

The following descriptions provide further explanations of the principle of projection of the two-plate projection apparatus 900 by referring to FIGS. 9A through 9D.

The projection apparatus 900 includes a light source for projecting a green laser light 915 from the front direction of the prism 910, and sequentially projecting the red laser light 916 or blue laser light 917 in a time division. The green laser light 915 and red laser light 916 or blue laser light 917 are reflected by the mirror devices 920 and 930 to the inclined surface of the prism 910. Then, the green laser light 915 and the red laser light 916 or blue laser light 917 reflected to the inclined surface side of the prism 910 are synthesized and the image is projected on the screen by way of the projection optical system 923.

The following description describing the projection of the individual laser lights 915, 916 and 917 from the front direction of the prism 910 followed by two mirror devices 920 and 930 reflect the laser lights 915, 916 and 917 to the inclined surface direction of the prism 910.

The green laser light 915 and the red laser light 916 or blue laser light 917 are projected respectively from the green laser light source 901 and the red laser light source 902 or blue laser light source 903. The green laser light 915 and the red laser light 916 or blue laser light 917 are transmitted through the illumination optical systems 904a and 904b to and through the light guide prism 914 to enter into the prism 910. Then, the green laser light 915 and the red or blue laser light 916 or 917 are transmitted in the prism 910 and projected into the package 911 and projected onto the bottom surface of the prism 910.

After passing through the package 911, the green laser light 915 and the red or blue laser lights 916 or 917 enter into two mirror devices 920 and 930 housed in a single package 911 correspond to the individual laser lights 915, 916 and 917. The lights are modulated at the respective mirror devices 920 and 930 and the individual laser lights 915, 916 and 917 are reflected to the inclined surface direction of the prism 910.

Figure 9B:
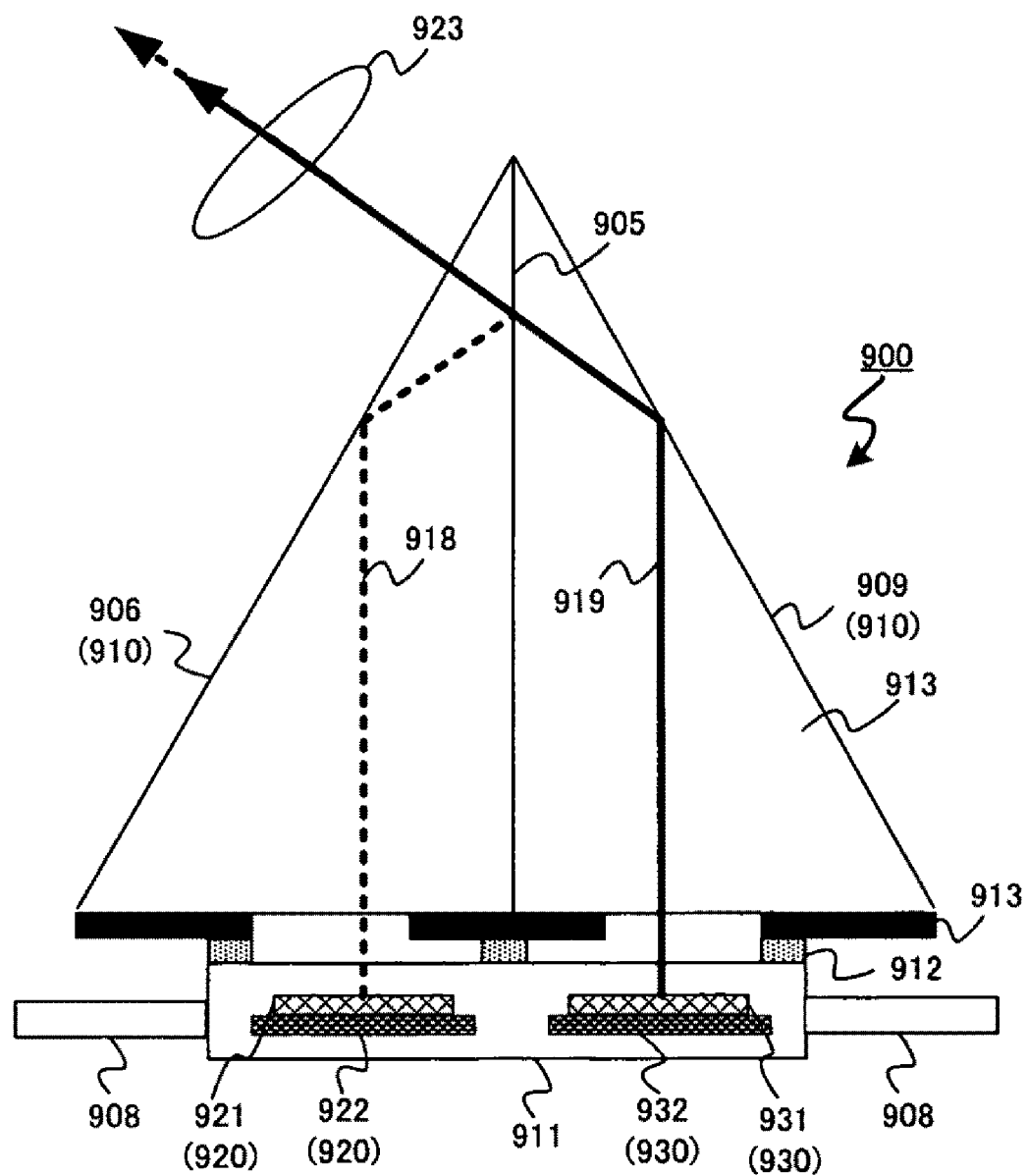
FIG. 9B is a rear view diagram for showing a two-plate projection apparatus.

The following description describes the projection paths of the individual laser lights 915, 916 and 917 at the respective mirror devices 920 and 930 until the projection of an image as illustrated in the two-plate projection apparatus 900 shown in FIG. 9B.

A green laser ON light 918 and a red or blue laser ON light 919 are reflected by mirror 920 and 930 respectively toward the rear surface of the prism 910 in the ON state. These lights are re-transmitted through the package 911 then entering into the prism 910. Then, the green laser ON light 918 and the red or blue laser ON light 919 are reflected respectively on the inclined surface of the prism 910. Then, the green laser ON light 918 is reflected again on the film 905 for transmitting only a light of a specific wavelength while reflecting the light of other wavelengths. Meanwhile, the red or blue laser ON light 919 is transmitted through the film 905. Then, the green laser light 918 and the red or blue laser light 919 are synthesized when projected onto the same optical path and is incident together to the projection optical system 923 to display a color. Note that the optical axes of the respective ON lights 918 and 919 for projecting to the projection optical system 923 from the prism 910 are preferably perpendicular to the emission surface of the prism 910.

Figure 9C:
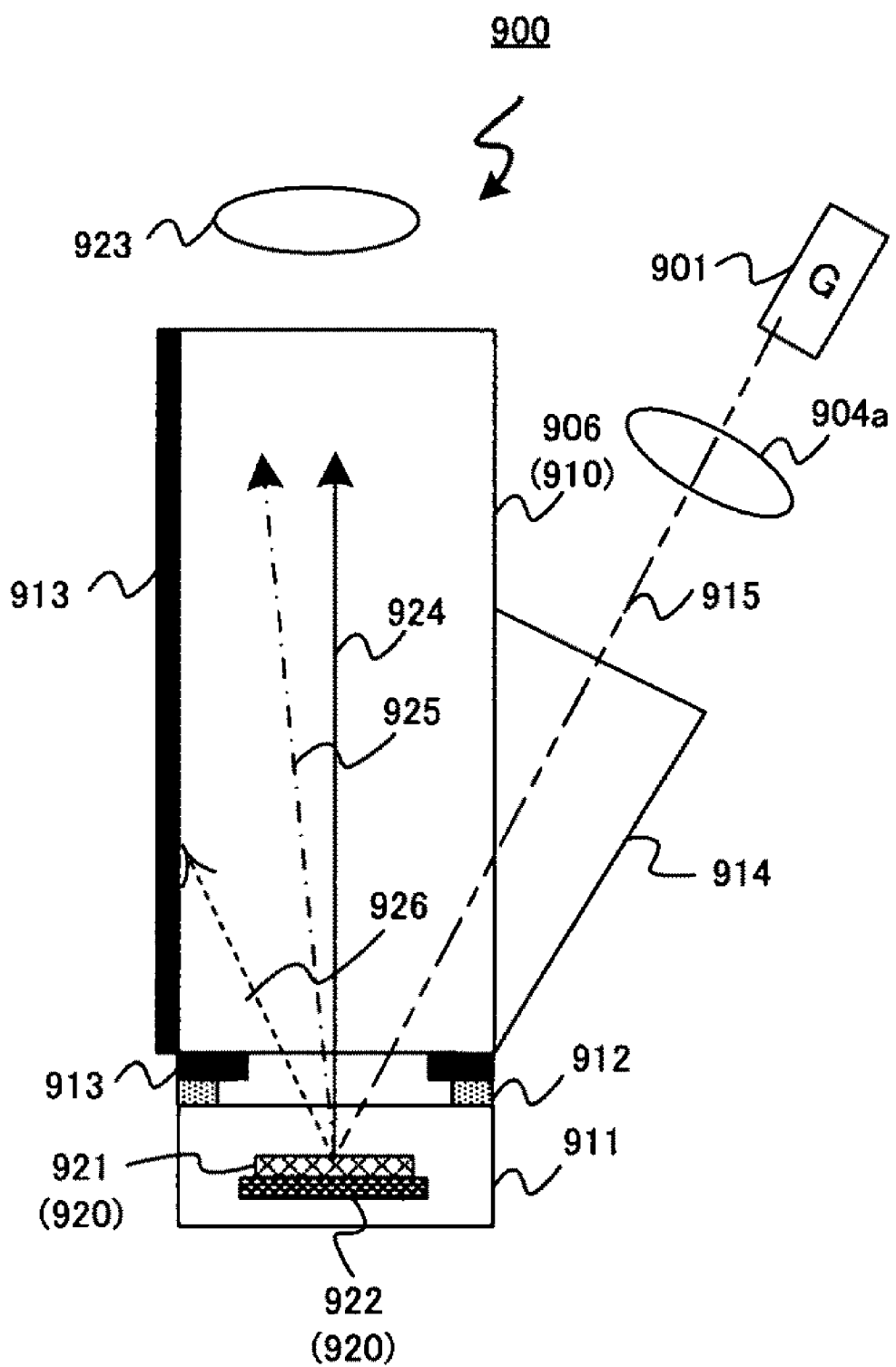
FIG. 9C is a side view diagram for showing a two-plate projection apparatus.

FIG. 9C is a side cross sectional view for showing a two-plate projection apparatus that includes two mirror devices described above.

The green laser light 915 projected from the green laser light source 901 enters into the light guide prism 914 along a perpendicular direction through the illumination optical system 904a. After the green light 915 transmits through the light guide prism 914, the green laser light 915 is projected through the prism 910 joined with the light guide prism 914 and enters the mirror array 921 of the mirror device 920 housed in the package 911.

The mirror array 921 reflects the incident green laser light 915 along the deflection angles of the mirror of the control states. The control states of the mirrors may include the ON state in which the entire reflection light enters the projection optical system 923, the intermediate light state in which a portion of the reflection light enters the projection optical system 923 and the OFF light state in which none of the reflection light enters the projection optical system 923. A green laser light 924 projected during an ON light state when reflected on the mirror array 921 for projecting the entire light to enter the projection optical system 923. Meanwhile, a laser light 925 projected during the intermediate state when reflected on the mirror array 921 for projecting a portion of the light to enter into the projection optical system 923.

Further, a laser light 926 projected during the OFF light is reflected by the mirror array 921 toward the light shield layer 913 formed on the rear surface of the prism 910. The reflected laser light 926 is absorbed in a light shield layer 913.

The green laser lights are projected with a maximum light intensity during an ON state, with a partial light intensity at an intermediate state between the ON light and OFF light states of the modulating mirror device, or projecting minimum light intensity, e.g., a zero light intensity during an OFF light state. By controlling the deflection angle of the mirror to operate and project light to the display optical path between the ON light state and OFF light state provides the flexibility for a mirror device to operate in an intermediate light state. Further, as the mirrors are controlled to freely oscillate and repeatedly passing through a range of deflection angles to project a portion of light to the image display optical system further provides an option to operate the mirror device in an intermediate state. By the number of free oscillations during a predetermined period provide a measure of controlling and adjusting intensity of light incident to the projection optical system 923. The projection of a light intensity in the intermediate state enables the image display system to project the images with a gray scales of higher gray scale resolution. Similar processes may also be carried out for the red and blue laser light sources 902 and 903 respectively on the reverse surface as that carried out for the green laser light source.

Figure 9D:
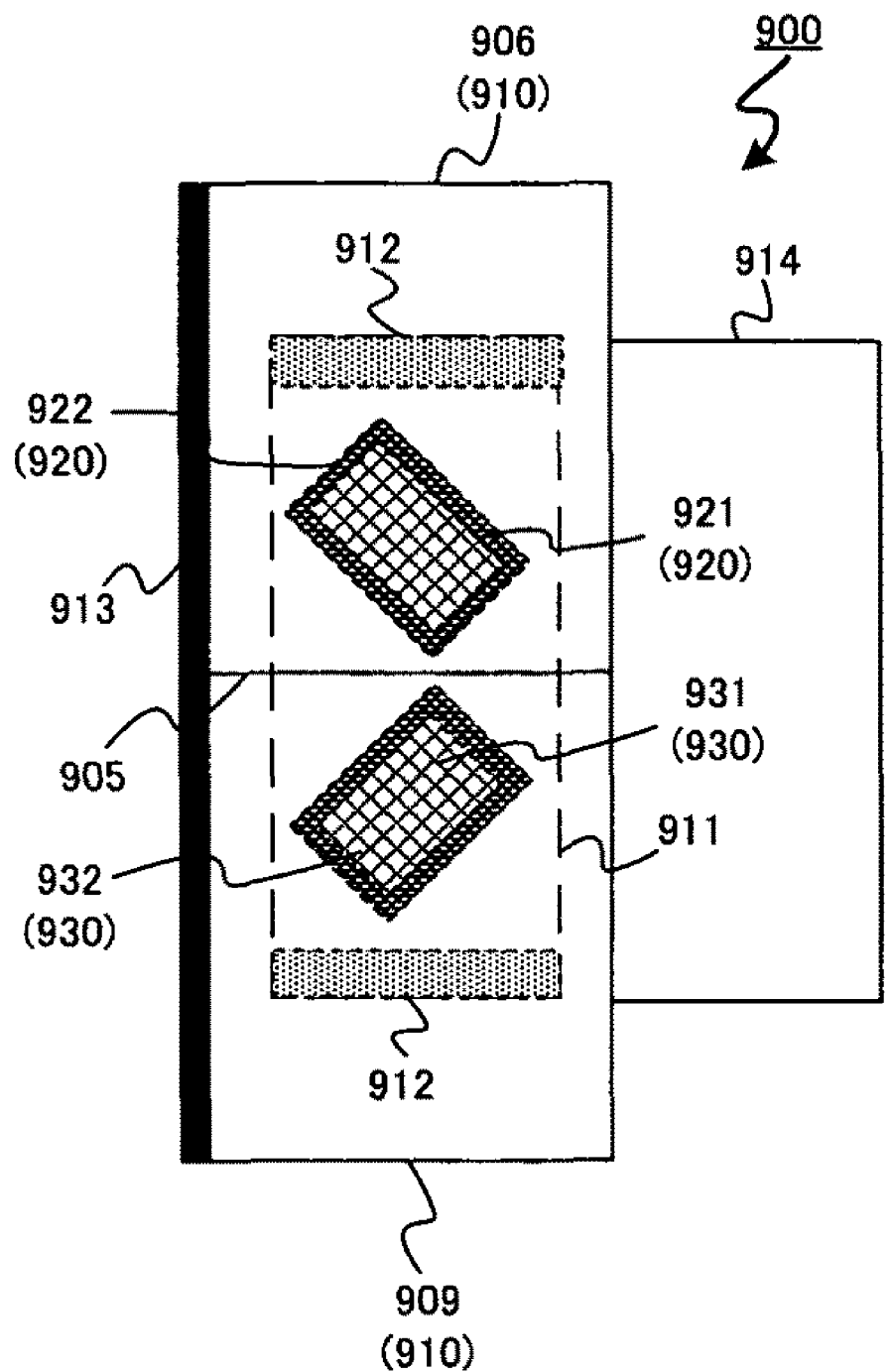
FIG. 9D is a top view diagram for showing a two-plate projection apparatus.

FIG. 9D is a top view of a two-plate projection apparatus comprising two mirror devices according to the present embodiment.

The light of an OFF light state is absorbed by the light shield layer 913 on the backend of the system and not reflected on the inclined surface of the prism 910 by placing the individual mirror devices 920 and 930 with an orientation having a 45-degree angle relative to the four sides of the outer circumference of the package 911 and on the same horizontal plane as shown in FIG. 9D.

<Three-Plate Projection Apparatus>

The following description explains the device configuration and operational processes of a three-plate projection apparatus. The three-plate projection apparatus includes three mirror devices to respond to respective lights projected from three groups of light sources. The apparatus further includes individual mirror devices to modulate the individual lights emitted from the respective light sources. Then, the apparatus synthesizes the individual lights after these lights re modulated by the respective mirror devices to project an image.

In an exemplary embodiment, an image projected with the lights of three colors, i.e., red light, green light and blue light, the individual lights are continuously modulated by the respective mirror devices. The individual lights modulated by the respective mirror devices are synthesized, for projecting a color image.

Figure 10:
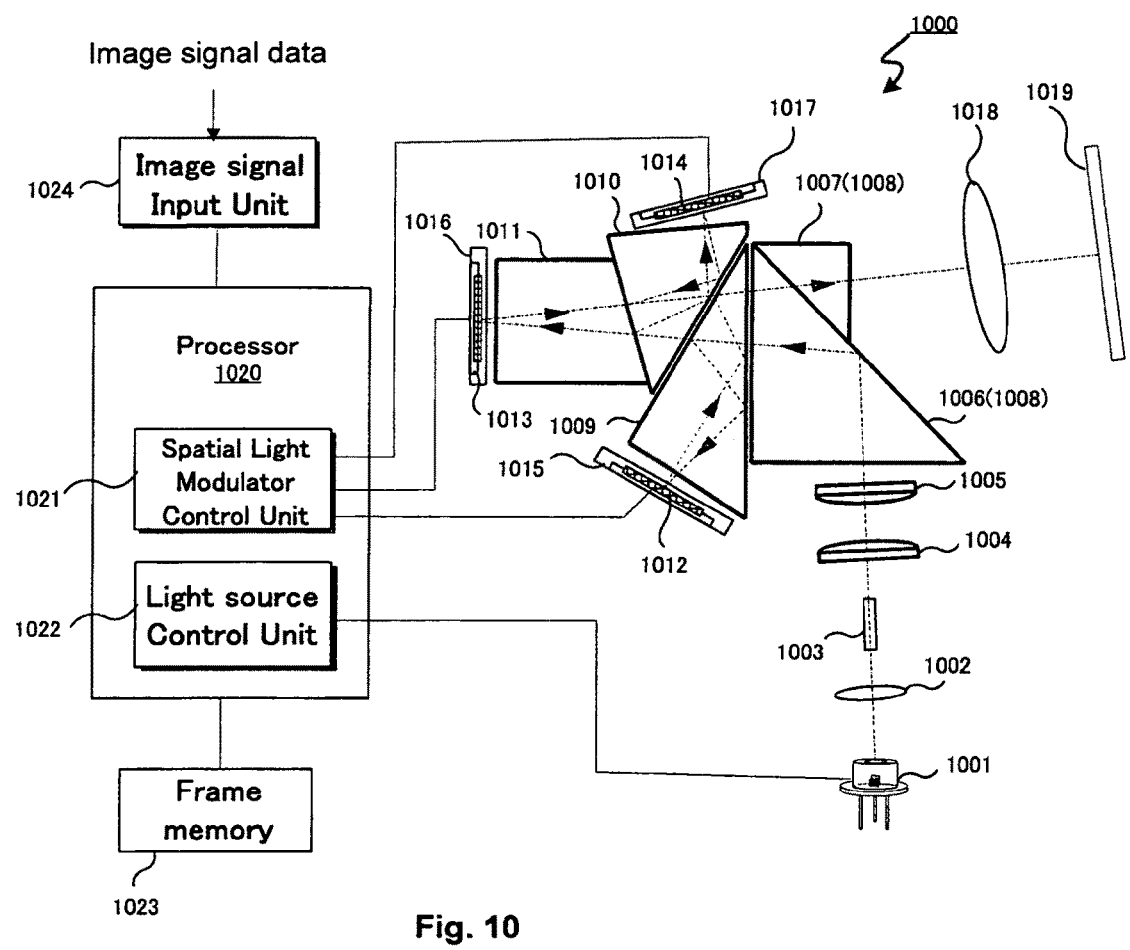
FIG. 10 is a functional block diagram for showing a three-plate projection apparatus comprising three mirror devices.

FIG. 10 is a functional block diagram for showing a three-plate projection apparatus that includes three mirror devices housed in respective packages according to the present embodiment.

The projection apparatus 1000 shown in FIG. 10 comprises a light source 1001, a first condenser lens 1002, a rod integrator 1003, a second condenser lens 1004, a third condenser lens 1005, a TIR prism 1008, a first dichroic prism 1009, a second dichroic prism 1010, a third prism 1011, individual mirror devices 1012, 1013 and 1014. The projection apparatus further includes individual packages 1015, 1016 and 1017 for housing and containing the respective mirror devices 1012, 1013 and 1014, and a projection lens 1018.

The light source 1001 may be implemented with a mercury lamp source, a laser light source, an LED, or the like, as in the case of the light source described for the single-plate projection apparatus and two-plate projection apparatus as describe above. The configuration and operation of the light source, such as the sub-light sources and light sources with pulse emission, are similar to the light sources for the projection apparatuses described above and therefore the descriptions are not repeated here.

Similar to those described for the single-plate projection apparatus, the first condenser lens 1002, rod integrator 1003, second condenser lens 1004 and third condenser lens 1005 perform the function of condensing the light. Meanwhile, the rod integrator 1003 performs a function of projecting a light with more a uniform intensity.

The TIR prism 1008 is similar to the prism described above for the single-plate projection apparatus and therefore the description will not be repeated here. Note that the TIR prism 1008 used for the three-plate projection apparatus shown in FIG. 10 includes a first prism 1006 and a second prism 1007.

The first dichroic prism 1009 and second dichroic prism 1010 are prisms that allow only the light of a specific wavelength to transmit through while reflecting the light of other wavelengths. Further, the third prism 1011 is a common prism. Note that the first dichroic prism 1009 and second dichroic prism 1010 may be configured by respective individual dichroic mirrors.

In the exemplary embodiment, FIG. 10 shows the case of configuring the first dichroic prism 1009 as a prism for reflecting only the light of the wavelength equivalent to red while transmitting the light of other wavelengths therethrough and the second dichroic prism 1010 as a prism reflecting only the light of the wavelength equivalent to blue while transmitting the light of other wavelengths therethrough. Further, FIG. 10 shows the case of configuring the third prism 1011 as a prism to project the light of the wavelength equivalent to a green wavelength along a straight-line direction.

The individual packages 1015, 1016 and 1017 house the respective mirror devices 1012, 1013 and 1014. The projection lens 1018 carries out a function of enlarging the individual lights for synthesis after the individual lights are reflected and modulated at the respective mirror devices 1012, 1013 and 1014. A processor 1020 is basically similar to the one described above for the single plate projection apparatus, and comprises a spatial light modulator control unit 1021 and a light source control unit 1022. Further, the processor 1020 processes the input image signal data as described for the single plate projection apparatus.

The spatial light modulator control unit 1021 is basically similar to the one described for the single plate projection apparatus. The SLM control unit 1021 is connected to the individual mirror devices 1012, 1013 and 1014. Further, the spatial light modulator control unit 1021 controls the individual mirror devices 1012, 1013 and 1014 independently and synchronously by applying the image signal data processed by the processor is the SLM control unit further controls the individual mirror devices 1012, 1013 and 1014 synchronously to function in a coordinate manner with other control and optical functional units of the image projection apparatus.

The light source control unit 1022, is similar to the one described for the single plate projection apparatus and is connected to the light source 1001 to control the light intensity of the light source including the function of controlling the number of sub-light sources to turn on or similar functions according to the image signal processed by the processor.

The descriptions for the frame memory 1023 and an image signal input unit 1024 are similar to the ones described for the single plate projection apparatus and therefore the description will not be repeated here.

The following description explains the optical functions and operational processes of the projection of a color image for the three-plate projection apparatus 1000 shown in FIG. 10.

In the three-plate projection apparatus 1000, the light projected from the light source 1001 is transmitted sequentially through the first condenser lens 1002, rod integrator 1003, second condenser lens 1004, third condenser lens 1005 to project to the first prism 1006 of the TIR prism 1008 at a critical angle or along a direction having a larger incident angle. Then, the incident light is totally reflected by the first prism 1006 of the TIR prism 1008.

The totally reflected light enters the first dichroic prism 1009. Then, on the light emission surface of the first dichroic prism 1009 and/or on the light incident surface of the second dichroic prism 1010, only the light of the wavelength equivalent to red, among the totally reflected light, is reflected, while the light of other wavelengths are passed through.

For the light incident to the second dichroic prism 1010, on the light emission surface of the second dichroic prism 1010 and/or the light incident surface of the third prism 1011, only the light of the wavelength equivalent to blue, among the incident light, is reflected, while the light of other wavelengths, that is the light substantially equivalent to green, is passed through.

The light of wavelengths equivalent to blue and red after entering into the third prism 1011 is removed and the light with wavelengths substantially equivalent to green travels straight in the third prism 1011.

Then, the lights that have special spectral distributions corresponding to individual wavelengths as described above are incident to the packages 1015, 1016 and 1017, respectively, which house the respective mirror devices 1012, 1013 and 1014 and which are placed on the respective side faces of the first dichroic prism 1009, second dichroic prism 1010 and third prism 1011.

The individual lights transmitted through the packages 1015, 1016 and 1017 then enter into respective mirror devices 1012, 1013 and 1014 of the present embodiment. Here, the individual mirror devices 1012, 1013 and 1014 are mutually independently controlled by the spatial light modulator control unit 1021 in response to the respective lights according to the image signal processed by the processor 1020. The individual mirror devices 1012, 1013 and 1014 modulate, and then reflect each of the respective incident lights.

Then, the light equivalent to the wavelength of red reflected by the mirror device 1012, re-enters the first dichroic prism 1009. Also, the light equivalent to the wavelength of blue reflected by the mirror device 1014, re-enters the second dichroic prism 1010. Further, the light equivalent to the wavelength of green reflected by the mirror device 1013, re-enters the third prism 1011.

The light equivalent to the wavelength of red re-entered into the first dichroic prism 1009, and the light equivalent to the wavelength of blue re-entered into the second dichroic prism 1010 then repeat some numbers of reflections in the respective prisms 1009 and 1010.

Then, the light equivalent to the wavelength of blue is projected along an overlapping optical path with that of the light equivalent to the wavelength of green, which has re-entered the second dichroic prism 1010 from the third prism 1011. The lights have overlapping optical path are thereby synthesized.

Then, the light synthesized with the wavelengths equivalent to green and blue enters the first dichroic prism 1009 from the second dichroic prism 1010.

Then, the light equivalent to the wavelength of red is projected along an overlapping optical path with that of the light equivalent to the wavelengths of green and blue, which has entered the first dichroic prism 1009 from the second dichroic prism 1010. The lights have overlapping optical path are thereby synthesized.

The light synthesized from the individual lights modulated by the respective mirror devices 1012, 1013 and 1014 enters the second prism 1007 of the TIR prism 1008 at the critical angle or along a direction have a smaller incline angle than the critical angle.

Then, the synthesized light is transmitted through the second prism 1007 of the TIR prism 1008 and is projected to the screen 1019 by way of the projection lens 1018. With optical transmissions projected through the above-described optical paths, a color image is projected at the three-plate projection apparatus.

In the exemplary configuration, when compared to the single-plate image display system described above, there will be no visual problems such as the so-called color breakup since each light of the primary colors is displayed at all times. Furthermore, effective use of emitted light from the light source projects a bright image displayed with a higher light intensity.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A mirror device, comprising:
a substrate having a wiring circuit disposed on a top surface of the substrate covered under an insulation layer;
an electrode disposed on top of the insulation layer and connected to the wiring circuit through a via connector penetrating through an opening in the insulation layer; and
a micro-electrical mechanical system (MEMS) structure directly connected to the electrode.

2. The mirror device according to claim 1, wherein:
the electrode further includes a top portion to support the MEMS structure wherein the MEMS structure further comprises an elastic part of a hinge.

3. The mirror device according to claim 1, wherein:
the electrode is further composed of an electrically conductive material includes at least one of a group of materials consisting of a metallic conductive material, a cooper, an aluminum, a tungsten, and an alloy of the metallic material.

* * * * *